United States Patent
Zhang

(10) Patent No.: US 10,169,089 B2
(45) Date of Patent: Jan. 1, 2019

(54) COMPUTER AND QUALITY OF SERVICE CONTROL METHOD AND APPARATUS

(71) Applicant: Huawei Technologies Co., Ltd., Shenzhen (CN)

(72) Inventor: Jian Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/845,568

(22) Filed: Dec. 18, 2017

(65) Prior Publication Data

US 2018/0121242 A1    May 3, 2018

Related U.S. Application Data

(63) Continuation of application No. PCT/CN2016/097535, filed on Aug. 31, 2016.

(30) Foreign Application Priority Data

Sep. 30, 2015 (CN) .......................... 2015 1 0641334

(51) Int. Cl.
   *G06F 3/06* (2006.01)
   *G06F 9/50* (2006.01)
   (Continued)

(52) U.S. Cl.
   CPC .......... *G06F 9/5016* (2013.01); *G06F 9/4881* (2013.01); *G06F 9/50* (2013.01);
   (Continued)

(58) Field of Classification Search
   None
   See application file for complete search history.

(56) References Cited

U.S. PATENT DOCUMENTS 7,451,183 B2 * 11/2008 Romero ................ G06F 9/5077
                                                   709/201
8,291,411 B2 * 10/2012 Beaty .................... G06F 9/4856
                                                   718/1
(Continued)

FOREIGN PATENT DOCUMENTS

CN       101826987 A       9/2010
CN       102591418 A       7/2012
(Continued)

OTHER PUBLICATIONS

Machine Translation and Abstract of Chinese Publication No. CN103002034, Mar. 27, 2013, 28 pages.
(Continued)

*Primary Examiner* — Hyun Nam
(74) *Attorney, Agent, or Firm* — Conley Rose, P.C.

(57) ABSTRACT

A computer, a method and apparatus for controlling quality of service (QoS), where the method comprises allocating, to at least one container of the computer, a container identity (ID), sending a bus request to a system bus, searching, according to the bus request, for a QoS parameter corresponding to both the container ID and a hardware device ID, and configuring, according to the found QoS parameter, a resource required when the container corresponding to the QoS parameter uses the hardware device corresponding to the QoS parameter. Hence, the system bus may perform corresponding QoS control according to the QoS parameter corresponding to both the container ID and the hardware device ID such that the hardware device allocated to the container can meet resource requirements of a process group in the container.

20 Claims, 12 Drawing Sheets

(51) Int. Cl.
    *G06F 9/48*     (2006.01)
    *G06F 12/1009*     (2016.01)
    *G06F 13/16*     (2006.01)
    *G06F 13/42*     (2006.01)

(52) U.S. Cl.
    CPC ........ *G06F 9/5011* (2013.01); *G06F 12/1009* (2013.01); *G06F 13/1621* (2013.01); *G06F 13/1657* (2013.01); *G06F 13/4234* (2013.01); *G06F 2212/657* (2013.01)

(56) References Cited

U.S. PATENT DOCUMENTS

| | | |
|---|---|---|
| 2006/0268699 A1 | 11/2006 | Balandin et al. |
| 2008/0077640 A1 | 3/2008 | Li et al. |
| 2008/0189522 A1 | 8/2008 | Meil et al. |
| 2012/0159090 A1* | 6/2012 | Andrews .................. G06T 1/20 711/153 |
| 2014/0007091 A1 | 1/2014 | Arges et al. |
| 2014/0082131 A1 | 3/2014 | Jagtap |
| 2014/0115037 A1* | 4/2014 | Liu .................... H04L 65/1016 709/203 |

FOREIGN PATENT DOCUMENTS

| | | |
|---|---|---|
| CN | 103002034 A | 3/2013 |
| CN | 103401917 A | 11/2013 |
| CN | 105183565 A | 12/2015 |

OTHER PUBLICATIONS

Machine Translation and Abstract of Chinese Publication No. CN103401917, Nov. 20, 2013, 13 pages.

Machine Translation and Abstract of Chinese Publication No. CN105183565, Dec. 23, 2015, 50 pages.

Foreign Communication From a Counterpart Application, PCT Application No. PCT/CN2016/097535, English Translation of International Search Report dated Dec. 5, 2016, 2 pages.

Machine Translation and Abstract of Chinese Publication No. CN101826987, Sep. 8, 2010, 36 pages.

Foreign Communication From a Counterpart Application, Chinese Application No. 201510641334.1, Chinese Office Action dated Jan. 29, 2018, 5 pages.

Wikipedia, "Associative array," https://en.wikipedia.org/wiki/Associative_array, Jul. 17, 2018, 6 pages.

Foreign Communication From a Counterpart Application, European Application No. 16850234.2, Extended European Search Report dated Jul. 11, 2018, 10 pages.

* cited by examiner

COMPUTER AND QUALITY OF SERVICE CONTROL METHOD AND APPARATUS

CROSS-REFERENCE TO RELATED APPLICATION

This application is a continuation of International Patent Application No. PCT/CN2016/097535 filed on Aug. 31, 2016, which claims priority to Chinese Patent Application No. 201510641334.1 filed on Sep. 30, 2015. The disclosures of the aforementioned applications are hereby incorporated by reference in their entireties.

TECHNICAL FIELD

The present disclosure relates to the computer field, and in particular, to a computer and a quality of service (QoS) control method and apparatus.

BACKGROUND

A container technology is a technology of resource isolation and resource allocation. Different process groups are allocated to different containers in order to implement isolation between process groups in the different containers and resource allocation between the different containers.

The different containers include different process groups, and the different process groups may have different resource requirements. Therefore, the different containers may have different resource requirements. For example, some containers need to occupy relatively large bandwidth and need a relatively fast response speed, and some containers need to occupy relatively small bandwidth and have a relatively low requirement on a response speed. Resource requirements of a process group in a container on different resources are referred to as QoS of the container.

During implementation of the present disclosure, other approaches have the following disadvantages. An existing computer cannot perform corresponding QoS control on a container when the container occupies or accesses a hardware device, as a result, resource requirements of a process group in the container cannot be met.

SUMMARY

To resolve a problem that resource requirements of a process group in a container cannot be met because an existing computer cannot perform corresponding QoS control on the container when the container occupies or accesses a hardware device, embodiments of the present disclosure provide a computer and a QoS control method and apparatus. Technical solutions are as follows.

According to a first aspect, a computer is provided, where the computer includes a system bus and at least three hardware devices connected to the system bus. The at least three hardware devices include a processor, a storage, and at least one another device, an operating system of the computer includes a scheduling subsystem. The operating system is stored in the storage, and a corresponding bus management module is provided in the system bus, where the processor is configured to invoke the scheduling subsystem to allocate, to at least one container of the computer, a container identity (ID) that corresponds one-to-one to the container. The processor or the other device is configured to send a bus request to the system bus, where the bus request carries the container ID and a hardware device ID of a hardware device used by the container indicated by the container ID. The bus management module is configured to search, according to the bus request, for a QoS parameter corresponding to both the container ID and the hardware device ID, where the QoS parameter is stored in the bus management module, and the bus management module is further configured to configure, according to the found QoS parameter, a resource required when the container corresponding to the QoS parameter uses the hardware device corresponding to the QoS parameter, where the resource includes at least one of bandwidth, a delay, or a priority.

In a first possible implementation manner of the first aspect, the hardware device used by the container is the other device, and the other device includes at least one of a network device, an encryption/decryption device, a display device, or a video encoding/decoding device, and in an aspect of sending a bus request to the system bus, the processor is further configured to invoke a first memory management (MM) subsystem in the operating system using the container to configure a device page table for the other device and store the device page table in a memory in the storage, where the device page table includes the container ID. The processor is further configured to send a page table read instruction to the other device using the first MM subsystem, where the page table read instruction is used to instruct a second MM subsystem in the other device to read the device page table from the memory, and the second MM subsystem is included in device software of the other device, or the other device is further configured to send, to the system bus, the bus request that carries the container ID and the hardware device ID, where the container ID in the bus request is read by the second MM subsystem from the memory.

In a second possible implementation manner of the first aspect, the hardware device used by the container is a memory in the storage or the processor, and in an aspect of sending a bus request to the system bus, the processor is further configured to send, to the system bus using a first MM subsystem in the operating system, the bus request that carries the container ID and the hardware device ID.

With reference to the first aspect, the first possible implementation manner of the first aspect, and the second possible implementation manner of the first aspect, in a third possible implementation manner of the first aspect, the processor is further configured to set, using the first MM subsystem in the operating system, page table attributes of all page tables in the operating system to using an application specific ID (ASID), and the processor is further configured to divide each ASID bit sequence into a container ID sequence and a process ID sequence using the scheduling subsystem.

With reference to the third possible implementation manner of the first aspect, in a fourth possible implementation manner of the first aspect, the processor is further configured to instruct, using the scheduling subsystem, the first MM subsystem to set a container ID in an ASID corresponding to a process established in the container to the container ID of the container in which the process is located, where the ASID corresponding to the process is located in a process page table corresponding to the process.

With reference to the third possible implementation manner of the first aspect, in a fifth possible implementation manner of the first aspect, the processor is further configured to instruct, using the scheduling subsystem, the first MM subsystem to modify the container ID in the ASID corresponding to a migrated process in the container, to the container ID of the container to which the process is migrated, from a container ID of a container from which the process is migrated, where the ASID corresponding to the migrated process is located in a process page table corresponding to the migrated process.

With reference to the first aspect, the first possible implementation manner of the first aspect, and the second possible implementation manner of the first aspect, in a sixth possible implementation manner of the first aspect, the bus management module is further configured to send an interrupt to the processor, where the interrupt is used to instruct the processor to send a QoS parameter configuration instruction to the scheduling subsystem, and the processor is further configured to invoke the scheduling subsystem to configure the QoS parameter for the container and the hardware device used by the container, and write the QoS parameter to the bus management module using the scheduling subsystem.

With reference to the first aspect, the first possible implementation manner of the first aspect, and the second possible implementation manner of the first aspect, in a seventh possible implementation manner of the first aspect, the processor is further configured to receive, using the scheduling subsystem, the QoS parameter that is of the container for each hardware device and that is set by a user, and write the QoS parameter to the bus management module using the scheduling subsystem, or the processor is further configured to receive, using the scheduling subsystem, the QoS parameter that is of the container for a target hardware device and that is set by a user, where the target hardware device refers to a hardware device that the container uses at frequency greater than a preset frequency threshold, and write the QoS parameter to the bus management module using the scheduling subsystem.

With reference to the seventh possible implementation manner of the first aspect, in an eighth possible implementation manner of the first aspect, the bus management module stores the QoS parameter of the container for the target hardware device, and the hardware device used by the container is not the target hardware device. The processor is further configured to obtain, using the scheduling subsystem, usage information about using the hardware device by the container in a predetermined period of time, invoke the scheduling subsystem to generate the corresponding QoS parameter for the container and the hardware device according to the usage information and bearer capability information that is of the computer, where the bearer capability information includes at least one of bandwidth information or delay information, and write the generated QoS parameter to the bus management module using the scheduling subsystem.

With reference to any one of the first aspect, or the first to the eighth possible implementation manners of the first aspect, in a ninth possible implementation manner of the first aspect, the processor is further configured to reclaim the container ID of the container during destruction of the container.

According to a second aspect, a QoS control method is provided, where the method is applied to a computer. The computer includes a system bus and at least three hardware devices connected to the system bus. The at least three hardware devices include a processor, a storage, and at least one another device, a corresponding bus management module is provided in the system bus, and the method includes allocating, to at least one container of the computer, a container ID that corresponds one-to-one to the container, sending a bus request to the system bus, where the bus request carries the container ID and a hardware device ID of a hardware device used by the container indicated by the container ID, searching, according to the bus request, for a QoS parameter corresponding to both the container ID and the hardware device ID, where the QoS parameter is stored in the bus management module, and configuring, according to the found QoS parameter, a resource required when the container corresponding to the QoS parameter uses the hardware device corresponding to the QoS parameter, where the resource includes at least one of bandwidth, a delay, or a priority.

In a first possible implementation manner of the second aspect, the hardware device used by the container is the other device, and the other device includes at least one of a network device, an encryption/decryption device, a display device, or a video encoding/decoding device, and sending a bus request to the system bus includes invoking a first MM subsystem in an operating system using the container to configure a device page table for the other device and store the device page table in a memory in the storage, where the device page table includes the container ID, sending a page table read instruction to the other device, where the page table read instruction is used to instruct a second MM subsystem in the other device to read the device page table from the memory, and the second MM subsystem is included in device software of the other device, and sending, by the other device of the computer to the system bus, the bus request that carries the container ID and the hardware device ID, where the container ID in the bus request is read by the second MM subsystem from the memory.

In a second possible implementation manner of the second aspect, the hardware device used by the container is a memory in the storage or the processor, and sending a bus request to the system bus includes sending, by the processor of the computer to the system bus using a first MM subsystem in an operating system, the bus request that carries the container ID and the hardware device ID.

With reference to any one of the second aspect, or the first to the second possible implementation manners of the second aspect, in a third possible implementation manner of the second aspect, the operating system of the computer includes a scheduling subsystem, and the operating system is stored in the storage, and allocating, to at least one container of the computer, a container ID that corresponds one-to-one to the container includes invoking the scheduling subsystem to allocate, to the at least one container, the container ID that corresponds one-to-one to the container.

With reference to the third possible implementation manner of the second aspect, in a fourth possible implementation manner of the second aspect, before invoking the scheduling subsystem to allocate, to the at least one container, the container ID that corresponds one-to-one to the container, the method includes setting, using the first MM subsystem in the operating system, page table attributes of all page tables in the operating system to using an ASID, and dividing each ASID bit sequence into a container ID sequence and a process ID sequence using the scheduling subsystem.

With reference to the fourth possible implementation manner of the second aspect, in a fifth possible implementation manner of the second aspect, after allocating, to at least one container of the computer, a container ID that corresponds one-to-one to the container, the method includes instructing, using the scheduling subsystem, the first MM subsystem to set a container ID in an ASID corresponding to a process established in the container to the container ID of the container in which the process is located, where the ASID corresponding to the process is located in a process page table corresponding to the process.

With reference to the fourth possible implementation manner of the second aspect, in a sixth possible implementation manner of the second aspect, after allocating, to at least one container of the computer, a container ID that corresponds one-to-one to the container, the method includes instructing, using the scheduling subsystem, the first MM subsystem to modify the container ID in the ASID corresponding to a migrated process in the container, to the container ID of the container to which the process is migrated, from a container ID of a container from which the process is migrated, where the ASID corresponding to the migrated process is located in a process page table corresponding to the migrated process.

With reference to the third possible implementation manner of the second aspect, in a seventh possible implementation manner of the second aspect, after searching, according to the bus request, for a QoS parameter corresponding to both the container ID and the hardware device ID, the method further includes sending, by the bus management module of the computer, an interrupt to the processor, where the interrupt is used to instruct the processor to send a QoS parameter configuration instruction to the scheduling subsystem, and invoking the scheduling subsystem to configure the QoS parameter for the container and the hardware device used by the container, and writing the QoS parameter to the bus management module using the scheduling subsystem.

With reference to the third possible implementation manner of the second aspect, in an eighth possible implementation manner of the second aspect, after allocating, to at least one container of the computer, a container ID that corresponds one-to-one to the container, the method further includes receiving, using the scheduling subsystem, the QoS parameter that is of the container for each hardware device and that is set by a user, and writing the QoS parameter to the bus management module using the scheduling subsystem, or receiving, using the scheduling subsystem, the QoS parameter that is of the container for a target hardware device and that is set by a user, where the target hardware device refers to a hardware device that the container uses at frequency greater than a preset frequency threshold, and writing the QoS parameter to the bus management module using the scheduling subsystem.

With reference to the eighth possible implementation manner of the second aspect, in a ninth possible implementation manner of the second aspect, the bus management module stores the QoS parameter of the container for the target hardware device, the hardware device used by the container is not the target hardware device, and the method further includes invoking the scheduling subsystem to obtain usage information about using the hardware device by the container in a predetermined period of time, generating the corresponding QoS parameter for the container and the hardware device according to the usage information and bearer capability information that is of the computer, where the bearer capability information includes at least one of bandwidth information or delay information, and writing the generated QoS parameter to the bus management module using the scheduling subsystem.

With reference to any one of the second aspect, or the first to the ninth possible implementation manners of the second aspect in an tenth possible implementation manner of the second aspect, the method further includes reclaiming the container ID of the container during destruction of the container.

According to a third aspect, a QoS apparatus is provided, where the apparatus is applied to a computer. The computer includes a system bus and at least three hardware devices connected to the system bus. The at least three hardware devices include a processor, a storage, and at least one another device, and the apparatus includes a scheduling subsystem module configured to allocate, to at least one container of the computer, a container ID that corresponds one-to-one to the container, a request sending module configured to send a bus request to the system bus, where the bus request carries the container ID and a hardware device ID of a hardware device used by the container indicated by the container ID, and a bus management module configured to search, according to the bus request, for a QoS parameter corresponding to both the container ID and the hardware device ID, where the QoS parameter is stored in the bus management module, and the bus management module is further configured to configure, according to the found QoS parameter, a resource required when the container corresponding to the QoS parameter uses the hardware device corresponding to the QoS parameter, where the resource includes at least one of bandwidth, a delay, or a priority.

In a first possible implementation manner of the third aspect, the hardware device used by the container is the other device, and the other device includes at least one of a network device, an encryption/decryption device, a display device, or a video encoding/decoding device, in an aspect of sending a bus request to the system bus, the request sending module is further configured to invoke a first MM subsystem in an operating system using the container to configure a device page table for the other device and store the device page table in a memory in the storage, where the device page table includes the container ID. The request sending module is further configured to send a page table read instruction to the other device, where the page table read instruction is used to instruct a second MM subsystem in the other device to read the device page table from the memory, and the second MM subsystem is included in device software of the other device, and the request sending module is further configured to invoke the other device of the computer to send, to the system bus, the bus request that carries the container ID and the hardware device ID, where the container ID in the bus request is read by the second MM subsystem from the memory.

In a second possible implementation manner of the third aspect, the hardware device used by the container is a memory in the storage or the processor, and in an aspect of sending a bus request to the system bus, the request sending module is further configured to invoke the processor of the computer to send, to the system bus using a first MM subsystem in an operating system, the bus request that carries the container ID and the hardware device ID.

With reference to the third aspect, the first possible implementation manner of the third aspect, and the second possible implementation manner of the third aspect, in a third possible implementation manner of the third aspect, the operating system of the computer includes a scheduling subsystem, and the operating system is stored in the storage, and in an aspect of allocating, to at least one container of the computer, a container ID that corresponds one-to-one to the container, the scheduling subsystem module is further configured to invoke the scheduling subsystem to allocate, to the at least one container, the container ID that corresponds one-to-one to the container.

With reference to the third possible implementation manner of the third aspect, in a fourth possible implementation manner of the third aspect, the scheduling subsystem module is further configured to set, using the first MM subsystem in the operating system, page table attributes of all page tables in the operating system to using an ASID, and the scheduling subsystem module is further configured to divide each ASID bit sequence into a container ID sequence and a process ID sequence using the scheduling subsystem.

With reference to the fourth possible implementation manner of the third aspect, in a fifth possible implementation manner of the third aspect, the scheduling subsystem module is further configured to instruct, using the scheduling subsystem, the first MM subsystem to set a container ID in an ASID corresponding to a process established in the container to the container ID of the container in which the process is located, where the ASID corresponding to the process is located in a process page table corresponding to the process.

With reference to the fourth possible implementation manner of the third aspect, in a sixth possible implementation manner of the third aspect, the scheduling subsystem module is further configured to instruct, using the scheduling subsystem, the first MM subsystem to modify the container ID in the ASID corresponding to a migrated process in the container, to the container ID of the container to which the process is migrated, from a container ID of a container from which the process is migrated, where the ASID corresponding to the migrated process is located in a process page table corresponding to the migrated process.

With reference to the third possible implementation manner of the third aspect, in a seventh possible implementation manner of the third aspect, the bus management module is further configured to send an interrupt to the processor, where the interrupt is used to instruct the processor to send a QoS parameter configuration instruction to the scheduling subsystem, and the scheduling subsystem module is further configured to invoke the scheduling subsystem to configure the QoS parameter for the container and the hardware device used by the container, and write the QoS parameter to the bus management module using the scheduling subsystem.

With reference to the third possible implementation manner of the third aspect, in an eighth possible implementation manner of the third aspect, the scheduling subsystem module is further configured to receive, using the scheduling subsystem, the QoS parameter that is of the container for each hardware device and that is set by a user, and write the QoS parameter to the bus management module using the scheduling subsystem, or the scheduling subsystem module is further configured to receive, using the scheduling subsystem, the QoS parameter that is of the container for a target hardware device and that is set by a user, where the target hardware device refers to a hardware device that the container uses at frequency greater than a preset frequency threshold, and write the QoS parameter to the bus management module using the scheduling subsystem.

With reference to the eighth possible implementation manner of the third aspect, in a ninth possible implementation manner of the third aspect, the bus management module stores the QoS parameter of the container for the target hardware device, and the hardware device used by the container is not the target hardware device. The scheduling subsystem module is further configured to invoke the scheduling subsystem to obtain usage information about using the hardware device by the container in a predetermined period of time, generate the corresponding QoS parameter for the container and the hardware device according to the usage information and bearer capability information that is of the computer, where the bearer capability information includes at least one of bandwidth information or delay information, and write the generated QoS parameter to the bus management module using the scheduling subsystem.

With reference to any one of the third aspect, or the first to the ninth possible implementation manners of the third aspect, in an tenth possible implementation manner of the third aspect, the scheduling subsystem module is further configured to reclaim the container ID of the container during destruction of the container.

The technical solutions provided in the embodiments of the present disclosure have the following beneficial effects.

A container ID is allocated to each container using a scheduling subsystem, a bus request that carries the container ID and a hardware device ID is sent to a system bus when the container uses a hardware device, and a bus management module provided in the system bus searches for a QoS parameter corresponding to both the container ID and the hardware device ID, and configures, according to the QoS parameter, a resource required when the container uses the hardware device. A problem is resolved that resource requirements of a process group in a container cannot be met because an existing computer cannot perform corresponding QoS control on the container when the container occupies or accesses a hardware device. The system bus may perform corresponding QoS control according to the QoS parameter corresponding to both the container ID and the hardware device ID such that the hardware device allocated to the container can meet the resource requirements of the process group in the container.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

QoS control methods provided in the embodiments of the present disclosure are applied to a computer, and the computer may be a server, a personal computer, a mobile phone, or various embedded systems. The computer may be divided into a hardware part and a software part according to software and hardware in the computer. The hardware part includes a memory, a processor, a system bus, another device, and the like, and the other device refers to a hardware device other than the memory and the processor in the computer. The software part includes an operating system, device software corresponding to the other device, and the like.

In a possible implementation manner, the other device may include a network device, an encryption/decryption device, a display device, a video encoding/decoding device, and the like. The network device may be a wired or wireless network interface card in the computer, the encryption/decryption device may be a device for encrypting/decrypting a data packet, the display device may be an external display of the computer, the video encoding/decoding device may be a video coder in the computer, and the like.

Figure 1A:
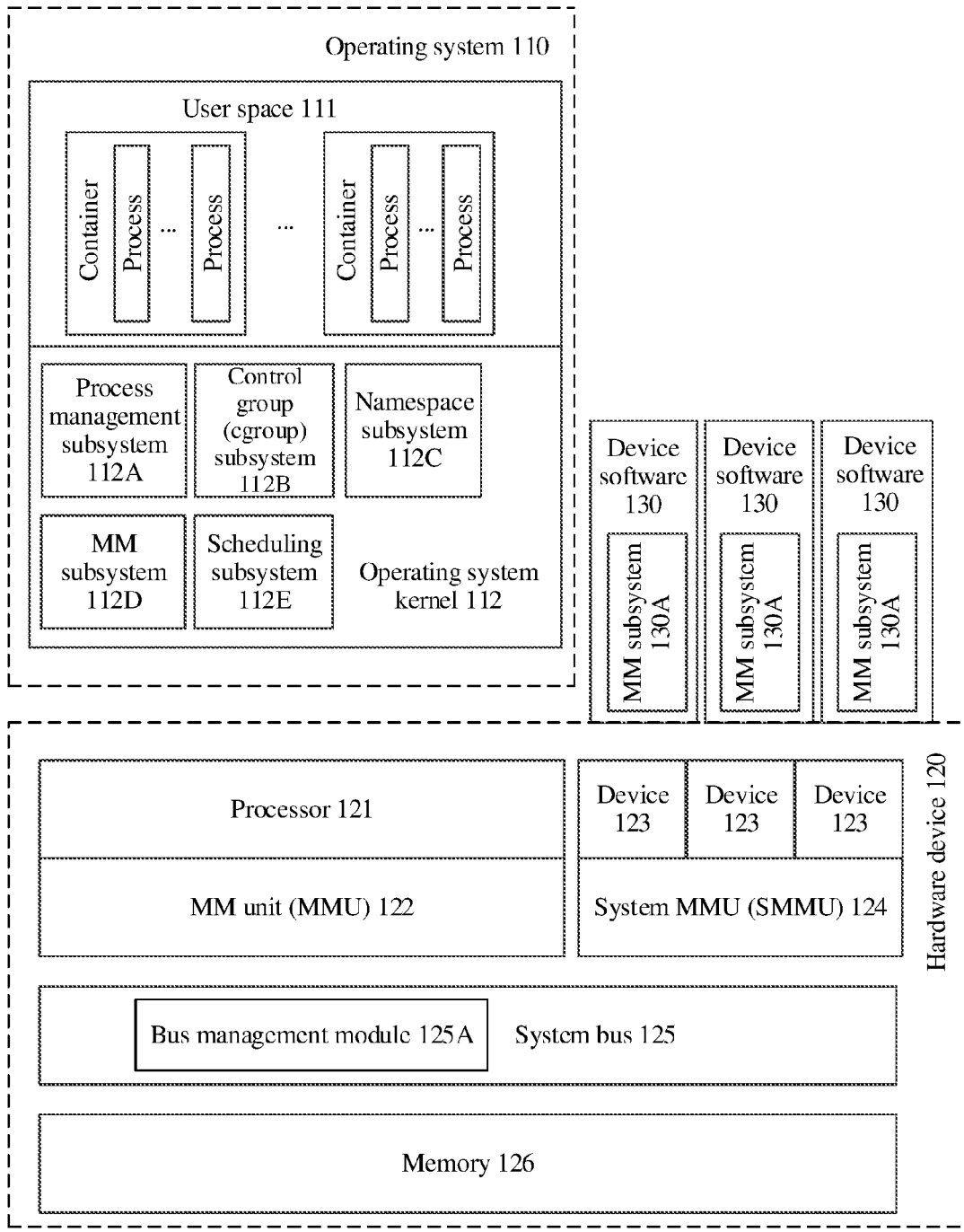
FIG. 1A is a schematic diagram of an implementation environment according to embodiments of the present disclosure.

Referring to FIG. 1A, FIG. 1A shows a schematic diagram of an implementation environment according to embodiments of the present disclosure. The implementation environment includes an operating system 110, a hardware device 120, and device software 130.

The operating system 110 may be divided into a user space 111 (a user mode) and an operating system kernel 112 (a kernel mode).

Containers in the embodiments of the present disclosure are all established in the user space 111, and each container operates and manages a different process.

The operating system kernel 112 is a core part of the operating system 110, and may include a process management subsystem 112A, a control group (cgroup) subsystem 112B, a namespace subsystem 112C, an MM subsystem 112D, and a scheduling subsystem 112E. The process management subsystem 112A is configured to manage processes in all containers, both the cgroup subsystem 112B and the namespace subsystem 112C are configured to maintain a container attribute, the MM subsystem 112D is configured to allocate and manage a memory 126, and the scheduling subsystem 112E is configured to perform QoS control on a container by cooperating with a bus management module 125A on a system bus 125.

It should be noted that, to ensure running of the computer, the operating system kernel 112 may further include another necessary subsystem. The foregoing subsystems are merely used as examples for description in the embodiments, and do not limit the present disclosure.

The hardware device 120 includes a processor 121, an MM unit (MMU) 122, at least one another device 123, a system MMU (SMMU) 124, a system bus 125, and a memory 126.

The processor 121 is a very large scale integrated circuit, and is configured to process data and an instruction in the computer. The computer provided in the embodiments may include one or more processors 121, and architectures of the processors 121 may be an x86 architecture, a POWERPC architecture, an advanced reduced instruction set computing (RISC) machine (ARM) architecture, or the like. A quantity and architectures of the processors are not limited in the present disclosure.

The MMU 122 corresponds to the MM subsystem 112D in the operating system kernel 112, and the SMMU 124 corresponds to an MM subsystem 130A in the device software 130 of the at least one other device 123.

The system bus 125 is electrically connected to each hardware device 120 in the computer, and controls, using the bus management module 125A correspondingly provided in the system bus 125, each hardware device 120 to access the memory 126, a network resource, and the like.

According to the QoS control methods provided in the embodiments of the present disclosure, the scheduling subsystem 112E in the operating system kernel 112 cooperates with the bus management module 125A, to implement QoS control on the container. The scheduling subsystem 112E is software, and the bus management module 125A is hardware. That is, in the present disclosure, QoS control on the container is implemented by means of combination of software and hardware.

Figure 1B:
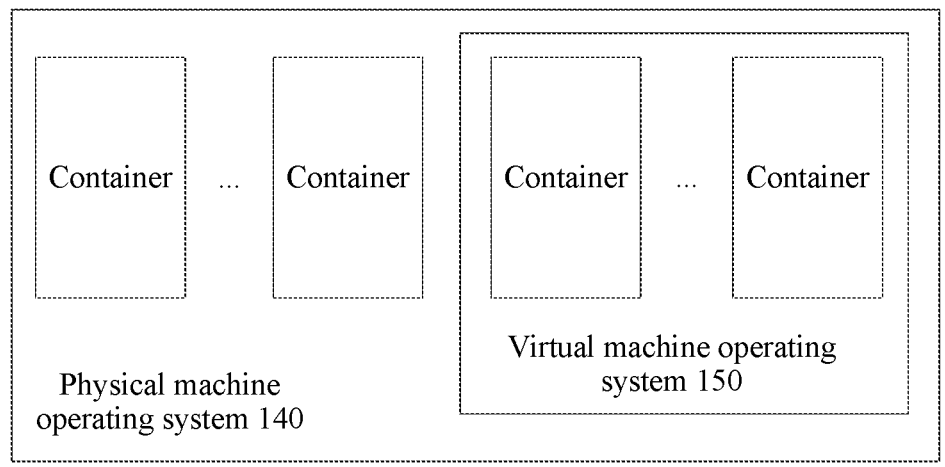
FIG. 1B is a schematic diagram of positions of containers in a QoS control method according to embodiments of the present disclosure.

It should be noted that, as shown in FIG. 1B, containers in the embodiments of the present disclosure may be all deployed in a physical machine operating system 140, or all deployed in a virtual machine operating system 150, or some containers are deployed in a physical machine operating system 140 and the other containers are deployed in a virtual machine operating system 150. That is, the operating system 110 in FIG. 1A may be an operating system in a virtual machine or an operating system in a physical machine, and the present disclosure sets no limitation thereto.

Figure 2:
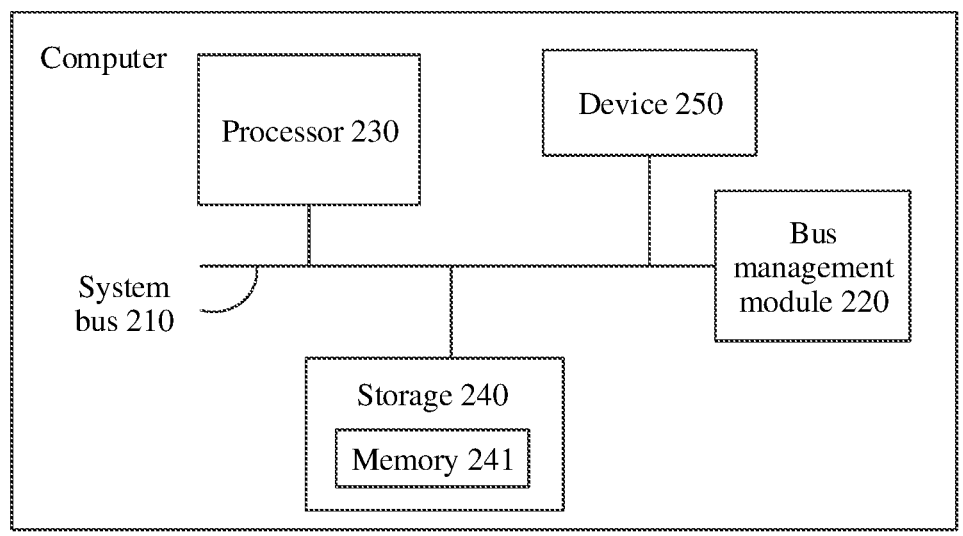
FIG. 2 is a block diagram of a computer according to an embodiment of the present disclosure.

Referring to FIG. 2, FIG. 2 shows a block diagram of a computer according to an embodiment of the present disclosure. The computer may include a system bus 210, a bus management module 220 correspondingly provided in the system bus 210, and at least three hardware devices connected to the system bus 210. The at least three hardware devices include a processor 230, a storage 240, and at least one another device 250. The storage 240 is configured to store one or more than one instruction, the instruction is configured as being executed by the processor 230, and the device 250 is a hardware device other than the processor 230 and the storage 240. An operating system is installed in the computer, and a scheduling subsystem is provided in the operating system.

The processor 230 is configured to invoke the scheduling subsystem to allocate, to at least one container of the computer, a container ID that corresponds one-to-one to the container.

The processor 230 or the device 250 is configured to send a bus request to the system bus 210, where the bus request carries the container ID and a hardware device ID of a hardware device used by the container indicated by the container ID.

The bus management module 220 is configured to search, according to the bus request, for a QoS parameter corresponding to both the container ID and the hardware device ID, where the QoS parameter is stored in the bus management module 220.

The bus management module 220 is further configured to configure, according to the found QoS parameter, a resource required when the container corresponding to the QoS parameter uses the hardware device corresponding to the QoS parameter, where the resource includes at least one of bandwidth, a delay, or a priority.

In a possible implementation manner, the hardware device used by the container is the device 250, and the device 250 includes at least one of a network device, an encryption/decryption device, a display device, or a video encoding/decoding device, and in an aspect of sending a bus request to the system bus 210, the processor 230 is further configured to invoke a first MM subsystem in the operating system using the container to configure a device page table for the device 250 and store the device page table in a memory 241 in the storage 240, where the device page table includes the container ID. The processor 230 is further configured to send a page table read instruction to the device 250 using the first MM subsystem, where the page table read instruction is used to instruct a second MM subsystem in the device 250 to read the device page table from the memory 241, and the second MM subsystem is included in device software of the device 250, or the device 250 is further configured to send, to the system bus 240, the bus request that carries the container ID and the hardware device ID, where the container ID in the bus request is read by the second MM subsystem from the memory 241.

In a possible implementation manner, the hardware device used by the container is a memory 241 in the storage 240 or the processor 230, and in an aspect of sending a bus request to the system bus 210, the processor 230 is further configured to send, to the system bus 210 using a first MM subsystem in the operating system, the bus request that carries the container ID and the hardware device ID.

In a possible implementation manner, the processor 230 is further configured to set, using the first MM subsystem in the operating system, page table attributes of all page tables in the operating system to using an ASID, and the processor 230 is further configured to divide each ASID bit sequence into a container ID sequence and a process ID sequence using the scheduling subsystem.

In a possible implementation manner, the processor 230 is further configured to instruct, using the scheduling subsystem, the first MM subsystem to set a container ID in an ASID corresponding to a process established in the container to the container ID of the container in which the process is located, where the ASID corresponding to the process is located in a process page table corresponding to the process.

In a possible implementation manner, the processor 230 is further configured to instruct, using the scheduling subsystem, the first MM subsystem to modify the container ID in the ASID corresponding to a migrated process in the container, to the container ID of the container to which the process is migrated, from a container ID of a container from which the process is migrated, where the ASID corresponding to the migrated process is located in a process page table corresponding to the migrated process.

In a possible implementation manner, the bus management module 220 is further configured to send an interrupt to the processor 230, where the interrupt is used to instruct the processor 230 to send a QoS parameter configuration instruction to the scheduling subsystem, and the processor 230 is further configured to invoke the scheduling subsystem to configure the QoS parameter for the container and the hardware device used by the container, and write the QoS parameter to the bus management module 220 using the scheduling subsystem.

In a possible implementation manner, the processor 230 is further configured to receive, using the scheduling subsystem, the QoS parameter that is of the container for each hardware device and that is set by a user, and write the QoS parameter to the bus management module 220 using the scheduling subsystem, or the processor 230 is further configured to receive, using the scheduling subsystem, the QoS parameter that is of the container for a target hardware device and that is set by a user, where the target hardware device refers to a hardware device that the container uses at frequency greater than a preset frequency threshold, and write the QoS parameter to the bus management module 220 using the scheduling subsystem.

In a possible implementation manner, the bus management module 220 stores the QoS parameter of the container for the target hardware device, and the hardware device used by the container is not the target hardware device. The processor 230 is further configured to obtain, using the scheduling subsystem, usage information about using the hardware device by the container in a predetermined period of time, invoke the scheduling subsystem to generate the corresponding QoS parameter for the container and the hardware device according to the usage information and bearer capability information that is of the computer, where the bearer capability information includes at least one of bandwidth information or delay information, and write the generated QoS parameter to the bus management module 220 using the scheduling subsystem.

In a possible implementation manner, the processor 230 is further configured to reclaim the container ID of the container during destruction of the container.

In conclusion, according to the computer provided in this embodiment, a container ID is allocated to each container using a scheduling subsystem, a bus request that carries the container ID and a hardware device ID is sent to the system bus 210 when the container uses a hardware device, and the bus management module 220 provided in the system bus 210 searches for a QoS parameter corresponding to both the container ID and the hardware device ID, and configures, according to the QoS parameter, a resource required when the container uses the hardware device. A problem is resolved that resource requirements of a process group in a container cannot be met because an existing computer cannot perform corresponding QoS control on the container when the container occupies or accesses a hardware device. The system bus 210 may perform corresponding QoS control according to the QoS parameter corresponding to both the container ID and the hardware device ID such that the hardware device allocated to the container can meet the resource requirements of the process group in the container.

In this embodiment, the scheduling subsystem divides an ASID part in page table attributes into a container ID part and a process ID part, and the bus management module 220 can identify the container ID in an ASID sequence in the bus request such that the bus management module 220 can find the QoS parameter corresponding to both the container ID and the hardware device ID, and perform QoS control, thereby meeting resource requirements of process groups in different containers.

In this embodiment, the scheduling subsystem reclaims the container ID during destruction of the container such that the container ID can be recycled, thereby effectively relieving a case of container ID insufficiency in a container ID pool.

Figure 3:
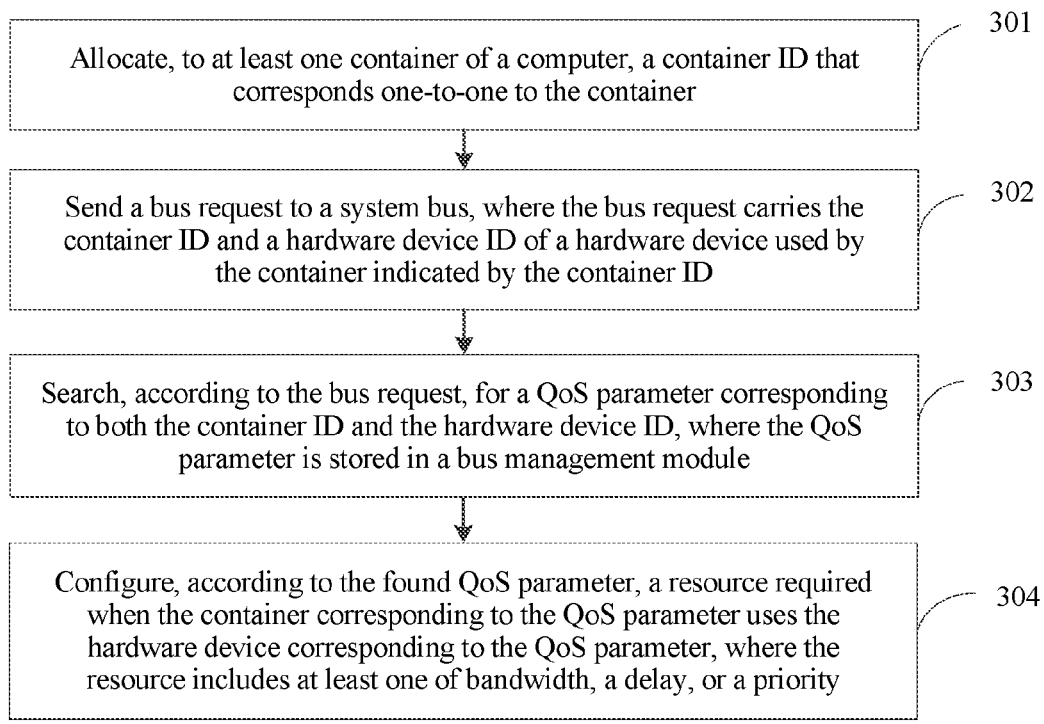
FIG. 3 is a method flowchart of a QoS control method according to an embodiment of the present disclosure.

Referring to FIG. 3, FIG. 3 shows a method flowchart of a QoS control method according to an embodiment of the present disclosure. This embodiment is described using an example in which the QoS control method is used in the implementation environment shown in FIG. 1A. The method includes the following steps.

Step 301: Allocate, to at least one container of a computer, a container ID that corresponds one-to-one to the container.

In a possible implementation manner, an operating system of the computer includes a scheduling subsystem, and when allocating a container ID to a container, the computer invokes the scheduling subsystem to allocate, to the at least one container, the container ID that corresponds one-to-one to the container.

Step 302: Send a bus request to a system bus, where the bus request carries the container ID and a hardware device ID of a hardware device used by the container indicated by the container ID.

In a possible implementation manner, the bus request may be sent to the system bus when the container uses the hardware device.

When the hardware device used by the container is a memory or a processor, the computer directly sends the bus request to the system bus using an MM subsystem in an operating system kernel.

When the hardware device used by the container is another device (a hardware device other than the memory and the processor) such as a network device, an encryption/decryption device, a display device, and a video encoding/decoding device, the computer sends the bus request to the system bus using an MM subsystem in device software corresponding to the other device.

Step 303: Search, according to the bus request, for a QoS parameter corresponding to both the container ID and the hardware device ID, where the QoS parameter is stored in a bus management module.

The bus management module may pre-store corresponding QoS parameters used when different containers use different hardware devices. System bandwidth occupied when the different containers use the different hardware devices is used as an example, and a mapping relationship among a container ID, a hardware device ID, and a QoS parameter may be shown in Table 1 as an example.

TABLE 1

|  | Container 1 | Container 2 |
| --- | --- | --- |
| Hardware device 1 | 10% | 20% |
| Hardware device 2 | 30% | 25% |

When the container 1 uses the hardware device 1, maximum occupied bandwidth is 10% of system total bandwidth, when the container 1 uses the hardware device 2, maximum occupied bandwidth is 30% of the system total bandwidth, when the container 2 uses the hardware device 1, maximum occupied bandwidth is 20% of the system total bandwidth, and when the container 2 uses the hardware device 2, maximum occupied bandwidth is 25% of the system total bandwidth.

It should be noted that, this embodiment is described by merely using the system bandwidth occupied when the different containers use the different hardware devices as an example, and in an actual application procedure, the bus management module may further store a delay, a priority, and the like used when the different containers use the different hardware devices. This embodiment sets no limitations thereto.

In a possible implementation manner, the bus management module searches a pre-stored mapping relationship, for example, the mapping relationship shown in Table 1, for a corresponding QoS parameter using the container ID and the hardware device ID carried in the bus request as indexes.

Step 304: Configure, according to the found QoS parameter, a resource required when the container corresponding to the QoS parameter uses the hardware device corresponding to the QoS parameter, where the resource includes at least one of bandwidth, a delay, or a priority.

In conclusion, according to the QoS control method provided in this embodiment, a container ID is allocated to each container using a scheduling subsystem, a bus request that carries the container ID and a hardware device ID is sent to a system bus when the container uses a hardware device, and a bus management module provided in the system bus searches for a QoS parameter corresponding to both the container ID and the hardware device ID, and configures, according to the QoS parameter, a resource required when the container uses the hardware device. A problem is resolved that resource requirements of a process group in a container cannot be met because an existing computer cannot perform corresponding QoS control on the container when the container occupies or accesses a hardware device. The system bus may perform corresponding QoS control according to the QoS parameter corresponding to both the container ID and the hardware device ID such that the hardware device allocated to the container can meet the resource requirements of the process group in the container.

Because different process groups in different containers execute different services, the different containers use different hardware devices. For example, some containers may need to decode a video file using a video encoding/decoding device, and some containers may need to perform computation by occupying a processor. Procedures of performing QoS control in a computer may be different when the containers use different types of hardware devices. Description is provided below using two embodiments as examples.

Figure 4A:
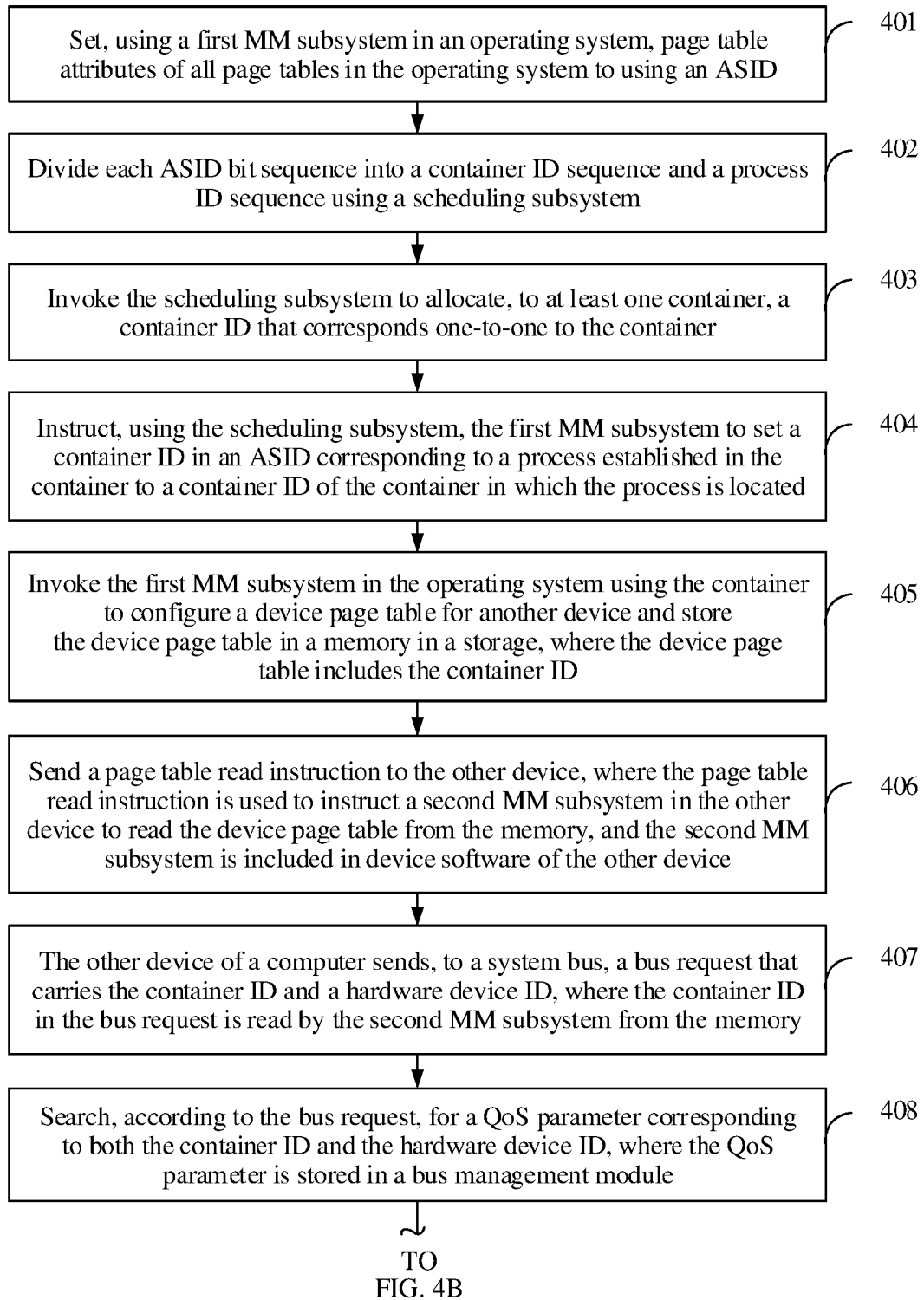
FIG. 4A and FIG. 4B are a method flowchart of a QoS control method according to another embodiment of the present disclosure.
Figure 4B:
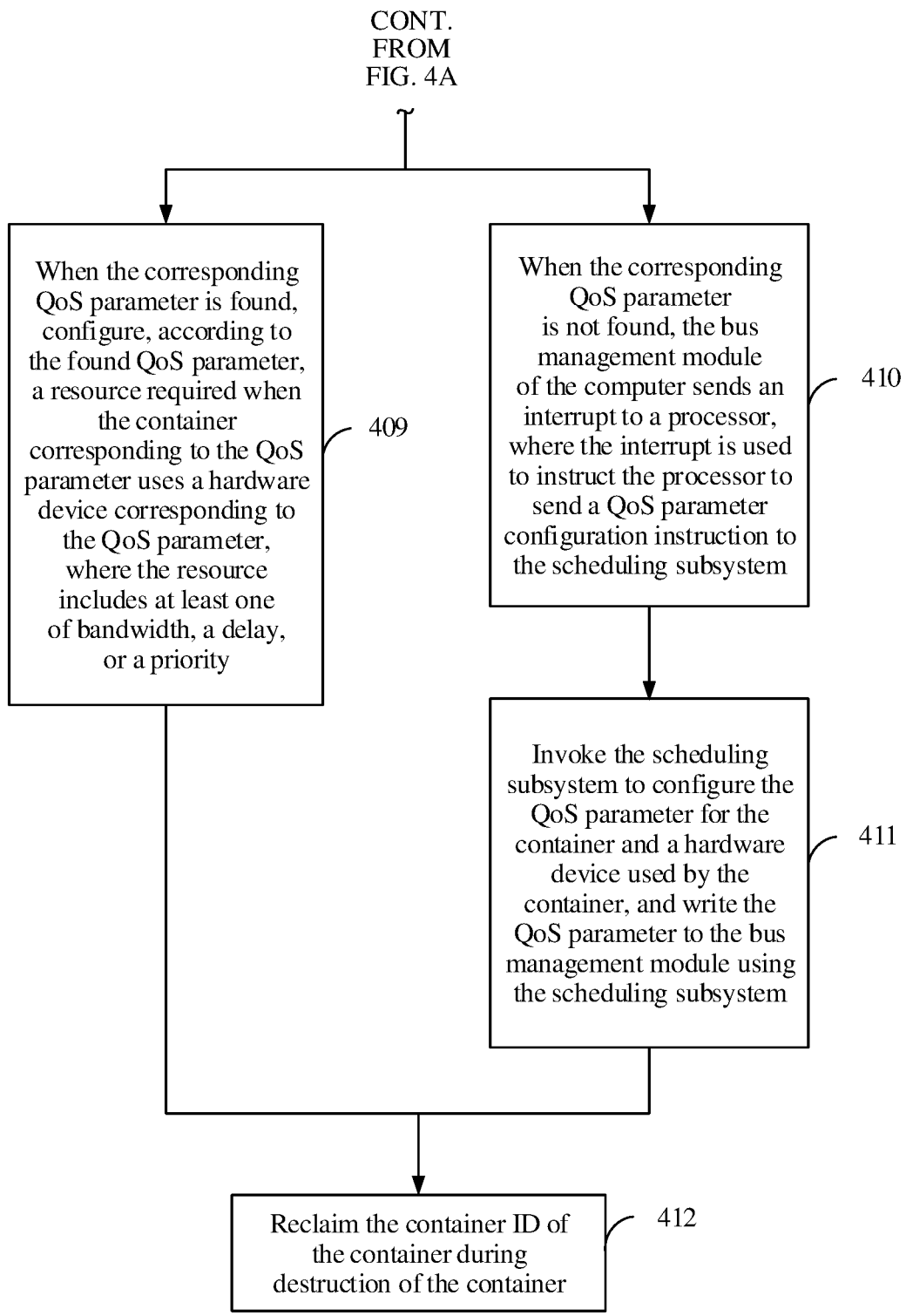

An embodiment of FIG. 4A and FIG. 4B is used to describe a procedure in which the computer performs QoS control on a container when the container uses another device connected to a system bus.

Figure 5A:
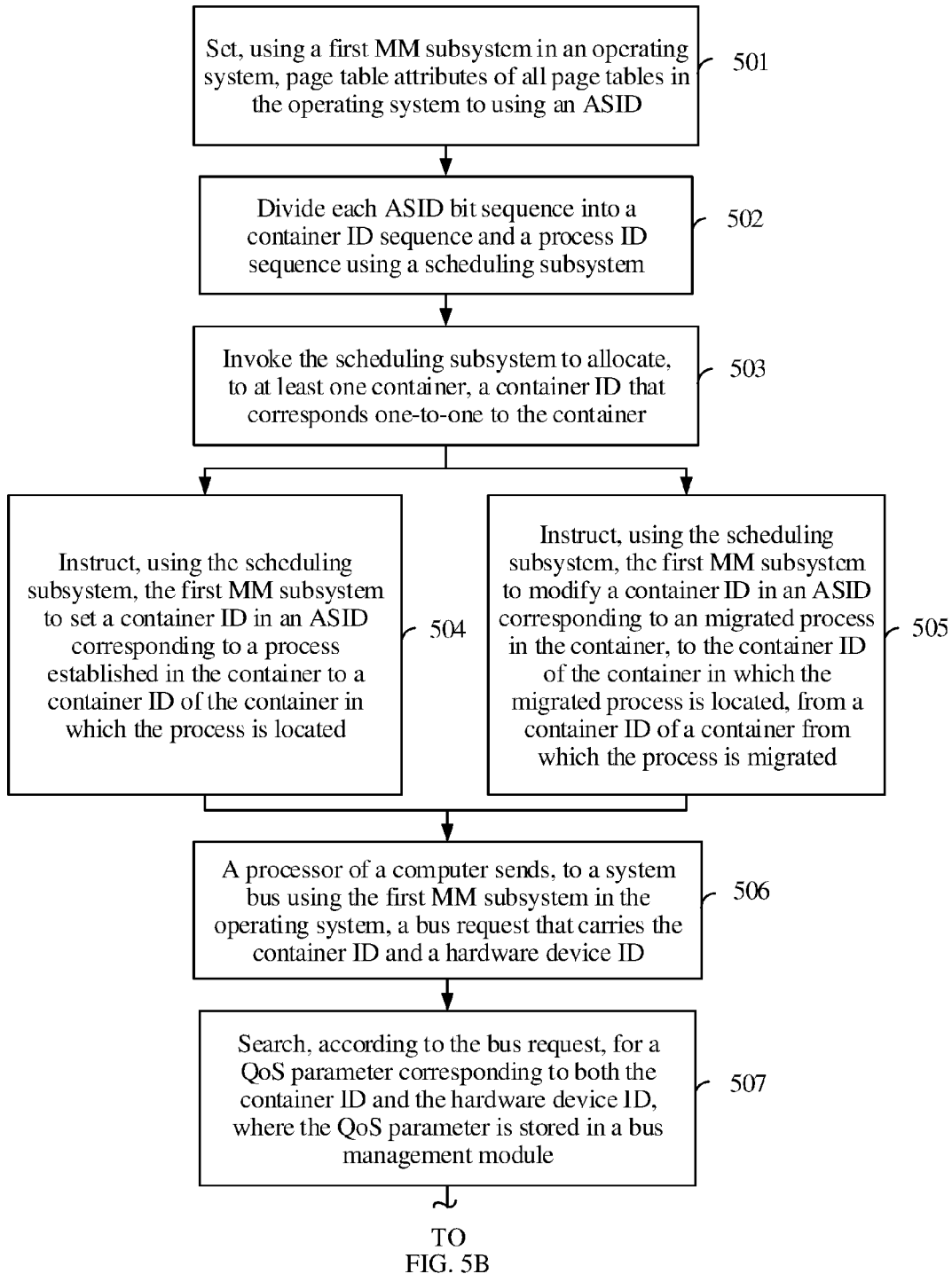
FIG. 5A and FIG. 5B are a method flowchart of a QoS control method according to still another embodiment of the present disclosure.
Figure 5B:
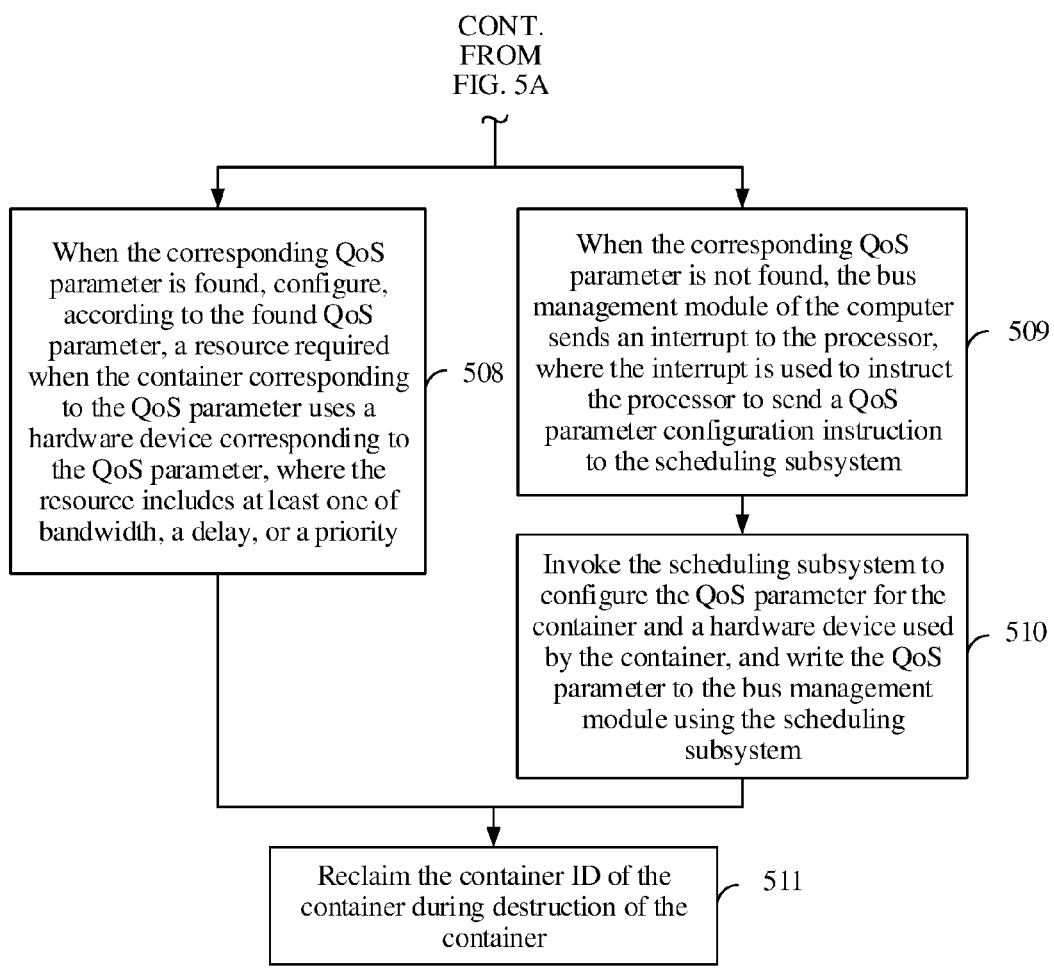

An embodiment of FIG. 5A and FIG. 5B is used to describe a procedure in which the computer performs QoS control on a container when the container uses a memory or a processor.

Referring to FIG. 4A and FIG. 4B, FIG. 4A and FIG. 4B show a method flowchart of a QoS control method according to another embodiment of the present disclosure. This embodiment is described using an example in which the QoS control method is used in the implementation environment shown in FIG. 1A and a hardware device used by a container is another device. The method includes the following steps.

Step 401: Set, using a first MM subsystem in an operating system, page table attributes of all page tables in the operating system to using an ASID.

Each process in a container has a process page table corresponding to the process, the process page table is used to implement functions of translation between a virtual address and a physical address and permission management, and the process may read data from a corresponding storage area in a memory using the process page table.

Because processes in the operating system share a same operating system kernel, the operating system kernel further includes kernel page tables corresponding to process page tables. By default, a page table attribute of a process page table include a process ID, and when the processes access a system bus, the system bus can distinguish the different processes according to process IDs, a page table attribute of a kernel page table do not include the process ID, and when the processes in the container need to access the system bus using the operating system kernel, the system bus cannot distinguish the processes according to the process IDs.

To make a process ID also carried when a process accesses the system bus using the operating system kernel, in a possible implementation manner, during initialization of the operating system kernel, the first MM subsystem that is in the operating system kernel and is responsible for managing the page table attributes sets global attributes in the page table attributes of all the page tables in the operating system to using an ASID. That is, the page table attributes of all the page tables include a process ID, and the all page tables include process page tables and kernel page tables.

For example, in an ARM or ARM64 architecture, during initialization of the operating system kernel, the first MM subsystem sets page table attributes nG of all the page tables to n. Setting to n indicates not global. By default, the page table attributes nG are set to global.

It should be noted that, because only one place in a page table needs to be modified during this setting, a subsequent page table generation speed is not affected.

Step 402: Divide each ASID bit sequence into a container ID sequence and a process ID sequence using a scheduling subsystem.

By means of the foregoing step, when a process in a container accesses the system bus using the operating system kernel, the system bus may identify the process according to an ASID in the page table attributes, but still cannot identify the container in which the process is located.

To enable the system bus to identify the container in which the process is located, in a possible implementation manner, when the operating system kernel starts, a bit sequence indicating the ASID further needs to be divided into two parts a container ID sequence and a process ID sequence using the scheduling subsystem in the operating system kernel.

For example, when an ASID has 16 bits, an ASID bit sequence may be divided into a container ID sequence of 10 bits and a process ID sequence of 6 bits. That is, in the ASID bit sequence, the container ID occupies 10 bits, and the process ID occupies 6 bits.

It should be noted that, a sequential order of the container ID and the process ID in the ASID bit sequence is not limited in the present disclosure. That is, in the ASID bit sequence, the former 10 bits may be the container ID, and the latter 6 bits are the process ID, or the former 6 bits are the process ID, and the latter 10 bits are the container ID.

Step 403: Invoke the scheduling subsystem to allocate, to at least one container, a container ID that corresponds one-to-one to the container.

During establishment of a container in a user space, the scheduling subsystem in the operating system allocates a container ID to the established container. In a possible implementation manner, the scheduling subsystem selects an unused container ID from a container ID pool (that is established by the scheduling subsystem after the container ID sequence is divided from the ASID bit sequence) as a container ID of the container, and writes the container ID to a container attribute. The container attribute is maintained by a cgroup subsystem and a namespace subsystem in the operating system kernel.

It should be noted that, the scheduling subsystem may randomly allocate an unused container ID in the container ID pool, or allocate a container ID according to a predetermined rule, and the present disclosure sets no limitation thereto.

Step 404: Instruct, using the scheduling subsystem, the first MM subsystem to set a container ID in an ASID corresponding to a process established in the container to a container ID of the container in which the process is located.

The ASID corresponding to the process is located in a process page table corresponding to the process.

During establishment of the process in the container, to enable the process page table corresponding to the process to indicate the container in which the process is located, the scheduling subsystem needs to instruct the first MM subsystem that manages the page table attributes to set a container ID sequence in the ASID in the process page table to the container ID of the current container. In a possible implementation manner, the ASID may be set in the page table attribute of the process page table.

For example, during establishment of a process in a container with a container ID of 0000000010, when the first MM subsystem sets page table attributes of all processes in the container, the first MM subsystem sets the container ID sequence in the ASID to 0000000010.

It should be noted that, a process ID of the process in the container is maintained by a process management subsystem in the operating system kernel, and when during establishment of the process in the container, the process management subsystem selects an unused process ID from a process ID pool and allocates the process ID to the process. Similar to modification of the container ID sequence in the ASID, after allocating the process ID to the newly-established process, the process management subsystem needs to instruct the first MM subsystem to correspondingly set a process ID sequence in the ASID.

Step 405: Invoke the first MM subsystem in the operating system using the container to configure a device page table for another device and store the device page table in a memory in a storage, where the device page table includes the container ID.

When the container uses the other device, the other device needs to occupy a corresponding resource by accessing the system bus. The resource may be the memory, a network resource, or the like. In this case, the other device needs to obtain the corresponding device page table, and accesses the system bus according to the device page table. The device page table has a function similar to that of a process page table, and is used to implement functions of translation between a virtual address and a physical address and permission management.

When the container uses the other device, the container invokes the first MM subsystem (that is, the MM subsystem 112D in the operating system kernel 112 in FIG. 1A) in the operating system to configure the corresponding device page table for the other device and store the configured device page table in the memory.

In a possible implementation manner, when device software corresponding to the other device can directly identify a process page table, the first MM subsystem may directly determine the process page table as the device page table. In another possible implementation manner, when device software corresponding to the other device cannot identify a process page table, the first MM subsystem configures a device page table that can be identified by the device software.

To enable the system bus to learn the container that uses the other device and perform corresponding QoS control on the container when the system bus receives a bus request sent by the other device, the first MM subsystem further needs to add the container ID to the device page table when configuring the device page table.

Step 406: Send a page table read instruction to the other device, where the page table read instruction is used to instruct a second MM subsystem in the other device to read the device page table from the memory, and the second MM subsystem is included in device software of the other device.

After the first MM subsystem finishes configuring the device page table, the first MM subsystem sends, using a processor, the page table read instruction to the device software corresponding to the used another device, to instruct the second MM subsystem (that is, the MM subsystem 130A in the device software 130 in FIG. 1A) in the device software to read the corresponding device page table from the memory.

It should be noted that because the memory may have device page tables of multiple other devices at the same time to enable the second MM subsystem to accurately read the device page table, the page table read instruction sent by the first MM subsystem to the device software further carries a page table base address of the device page table, and the second MM subsystem in the device software may read the corresponding device page table from the memory according to the page table base address.

In addition, it should be noted that, when the other device used by the container does not have corresponding device software, but has hardware logic that can read the device page table from the memory, the other device may also read the corresponding device page table from the memory using the hardware logic (that is, the QoS control method provided in the present disclosure is not dependent on device software in a device), and the present disclosure sets no limitation thereto.

Step 407: The other device of a computer sends, to a system bus, a bus request that carries the container ID and a hardware device ID, where the container ID in the bus request is read by the second MM subsystem from the memory.

After receiving the page table read instruction that is sent by the first MM subsystem using the processor, the device software reads the device page table from the memory into the second MM subsystem using an SMMU corresponding to the other device.

The second MM subsystem may read, from a page table attribute of the device page table, the container ID of the container indicated by the process that uses the other device, and send, to the system bus using the SMMU corresponding to the other device, the bus request that carries the container ID and the hardware device ID. It should be noted that, because the second MM subsystem in the device software does not have a capability of identifying a container ID in an ASID bit sequence, the container ID carried in the bus request refers to an ASID bit sequence in the page table attribute corresponding to the other device page table.

Step 408: Search, according to the bus request, for a QoS parameter corresponding to both the container ID and the hardware device ID, where the QoS parameter is stored in a bus management module.

The bus management module in this embodiment of the present disclosure has a capability of identifying a container ID and a process ID in an ASID bit sequence. The bus management module receives the bus request carrying the ASID bit sequence, and can identify the container ID part and the process ID part from the ASID bit sequence.

The bus management module identifies the container ID part in the ASID bit sequence and the hardware device ID, and searches a pre-stored mapping relationship among a container ID, a hardware device ID, and a QoS parameter, to find out whether the QoS parameter matching both the container ID and the hardware device ID is included. The mapping relationship may be set by a user during establishment of the container. The mapping relationship among a container ID, a hardware device ID, and a QoS parameter may be shown in Table 1 as an example.

Step 409: When the corresponding QoS parameter is found, configure, according to the found QoS parameter, a resource required when the container corresponding to the QoS parameter uses a hardware device corresponding to the QoS parameter, where the resource includes at least one of bandwidth, a delay, or a priority.

When the QoS parameter corresponding to both the container ID and the hardware device ID is found, the bus management module configures the resource required when the container corresponding to the QoS parameter uses the hardware device corresponding to the QoS parameter. QoS control performed by the bus management module is specified by the found QoS parameter.

For example, when the bus management module identifies that the container ID is "container 1" and the hardware device ID is "hardware device 1," and the mapping relationship shown in Table 1 is stored, the bus management module learns that maximum occupied bandwidth is 10% of system total bandwidth when a container 1 uses a hardware device 1. In a possible implementation manner, when the bus management module detects that occupied bandwidth exceeds 10% when the container 1 uses the hardware device 1, the bus management module limits the bandwidth occupied by the container 1. In another possible implementation manner, when the bus management module detects that occupied bandwidth exceeds 10% when the container 1 uses the hardware device 1, the bus management module obtains a current total usage percentage of the system bandwidth, and when the total usage percentage is greater than a preset threshold, the bus management module limits the container 1, or when the total usage percentage is less than the preset threshold, the bus management module does not limit the container 1.

For another example, the bus management module identifies that the container ID is "container 1" and the hardware device ID is "hardware device 1," and a stored mapping relationship among a container ID, a hardware device ID, and a priority is shown in Table 2.

TABLE 2

|  | Container 1 | Container 2 |
|---|---|---|
| Hardware device 1 | 1 | 2 |
| Hardware device 2 | 3 | 2 |

When both the container 1 and the container 2 need to use the hardware device 1, because a priority at which the container 1 uses the hardware device 1 is lower than a priority at which the container 2 uses the hardware device 1, the bus management module preferentially meets a bus request in which the container 2 uses the hardware device 1. When both the container 1 and the container 2 need to use the hardware device 2, because a priority at which the container 1 uses the hardware device 2 is higher than a priority at which the container 2 uses the hardware device 2, the bus management module preferentially meets a bus request in which the container 1 uses the hardware device 2.

Step 410: When the corresponding QoS parameter is not found, the bus management module of the computer sends an interrupt to a processor, where the interrupt is used to instruct the processor to send a QoS parameter configuration instruction to the scheduling subsystem.

When the bus management module does not find the QoS parameter corresponding to both the container ID and the hardware device ID, the bus management module sends the interrupt to the processor. After receiving the interrupt, the processor sends the QoS parameter configuration instruction to the scheduling subsystem. The QoS parameter configuration instruction is used to instruct the scheduling subsystem to configure the corresponding QoS parameter for the container and the hardware device.

It should be noted that, the bus management module may further command, by sending information or in another manner, the processor to send the QoS parameter configuration instruction to the scheduling subsystem, and the present disclosure sets no limitation thereto.

Step 411: Invoke the scheduling subsystem to configure the QoS parameter for the container and a hardware device used by the container, and write the QoS parameter to the bus management module using the scheduling subsystem.

After receiving the QoS parameter configuration instruction, the scheduling subsystem receives a QoS parameter entered by a user, or sets, according to a current system status of the computer, a QoS parameter meeting the current computer status, and writes the set QoS parameter to the bus management module.

Correspondingly, the bus management module performs corresponding QoS control on the container according to the QoS parameter written by the scheduling subsystem.

Step 412: Reclaim the container ID of the container during destruction of the container.

To avoid container ID insufficiency in the container ID pool, the scheduling subsystem reclaims the container ID in the container attribute during destruction of the container.

It should be noted that, because there may be some remaining processes in a to-be-destructed container, to ensure normal running of the operating system, whether there are remaining processes in the container may be detected before the container is destructed. If there are remaining processes, the process management subsystem is instructed to reclaim process IDs corresponding to the remaining processes, and destruct the remaining processes.

In conclusion, according to the QoS control method provided in this embodiment, a container ID is allocated to each container using a scheduling subsystem, a bus request that carries the container ID and a hardware device ID is sent to a system bus when the container uses a hardware device, and a bus management module provided in the system bus searches for a QoS parameter corresponding to both the container ID and the hardware device ID, and configures, according to the QoS parameter, a resource required when the container uses the hardware device. A problem is resolved that resource requirements of a process group in a container cannot be met because an existing computer cannot perform corresponding QoS control on the container when the container occupies or accesses a hardware device. The system bus may perform corresponding QoS control according to the QoS parameter corresponding to both the container ID and the hardware device ID such that the hardware device allocated to the container can meet the resource requirements of the process group in the container.

In this embodiment, the scheduling subsystem divides an ASID part in page table attributes into a container ID part and a process ID part, and the bus management module can identify the container ID in an ASID bit sequence in the bus request such that the bus management module can find the QoS parameter corresponding to both the container ID and the hardware device ID, and perform QoS control, thereby meeting resource requirements of process groups in different containers.

In this embodiment, the scheduling subsystem reclaims the container ID during destruction of the container such that the container ID can be recycled, thereby effectively relieving a case of container ID insufficiency in a container ID pool.

Figure 4C:
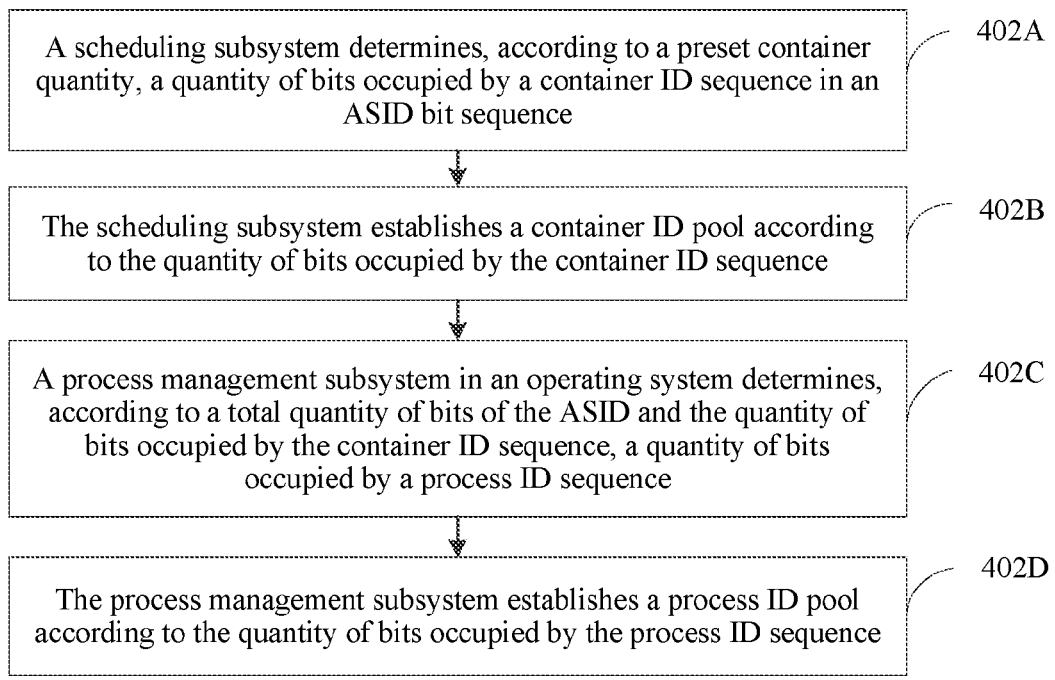
FIG. 4C is a method flowchart of an ASID dividing procedure related in the QoS control method provided in FIG. 4A and FIG. 4B.

In a possible implementation manner, as shown in FIG. 4C, in the foregoing step 402, a procedure in which the scheduling subsystem divides each ASID bit sequence into a container ID sequence and a process ID sequence may further include the following steps.

Step 402A: The scheduling subsystem determines, according to a preset container quantity, a quantity of bits occupied by the container ID sequence in the ASID bit sequence.

The scheduling subsystem may determine, according to a maximum quantity of containers that can be established in the operating system, the quantity of bits occupied by the container ID sequence. For example, an ARM architecture is used as an example, a chip that uses the ARM architecture has a maximum of 96 cores, and 10 containers can be established in each core. Therefore, the maximum quantity of containers that can be established in the operating system is 96*10=960. To enable different containers to have different container IDs, the container ID occupies 10 bits.

It should be noted that, the scheduling subsystem may also determine, according to a container quantity preset by a user, the quantity of bits occupied by the container ID, and a manner of determining the container quantity in the operating system is not limited in the present disclosure.

Step 402B: The scheduling subsystem establishes a container ID pool according to the quantity of bits occupied by the container ID sequence.

The scheduling subsystem establishes the container ID pool according to the quantity that is of bits occupied by the container ID and that is determined in step 402A. A quantity of container IDs in the container ID pool is greater than a quantity of containers in the operating system.

Step 402C: A process management subsystem in the operating system determines, according to a total quantity of bits of the ASID and the quantity of bits occupied by the container ID sequence, a quantity of bits occupied by the process ID sequence.

After the quantity of bits occupied by the container ID is determined according to the foregoing step 402A, the process management subsystem that is in the operating system kernel and is configured to manage process IDs may determine, according to the total quantity of bits of the ASID and the quantity of bits occupied by the container ID sequence, the quantity of bits occupied by the process ID sequence.

For example, if the total quantity of bits of the ASID is 16, and the container ID sequence occupies 10 bits, the process ID sequence occupies 16−10=6 bits.

Step 402D: The process management subsystem establishes a process ID pool according to the quantity of bits occupied by the process ID sequence.

Similar to step 402B, after determining the quantity of bits occupied by the process ID sequence, the process management subsystem establishes the corresponding process ID pool according to the quantity of bits.

For example, the quantity of bits of the ASID in the page table attributes is 16, the container ID sequence occupies 10 bits, and the process ID sequence occupies 6 bits. An ASID: 0000000010000010 indicates that the process ID of the process is 000010, and that the container ID of the container in which the process is located is 0000000010. It should be noted that, this embodiment is described by merely using an example in which the former 10 bits of the ASID bit sequence indicate the container ID, and the latter 6 bits indicate the process ID, and a sequential order of the container ID and the process ID in the ASID bit sequence is not limited.

In the foregoing embodiment, the ARM architecture is merely used as an example for description, and does not limit the present disclosure.

Figure 4D:
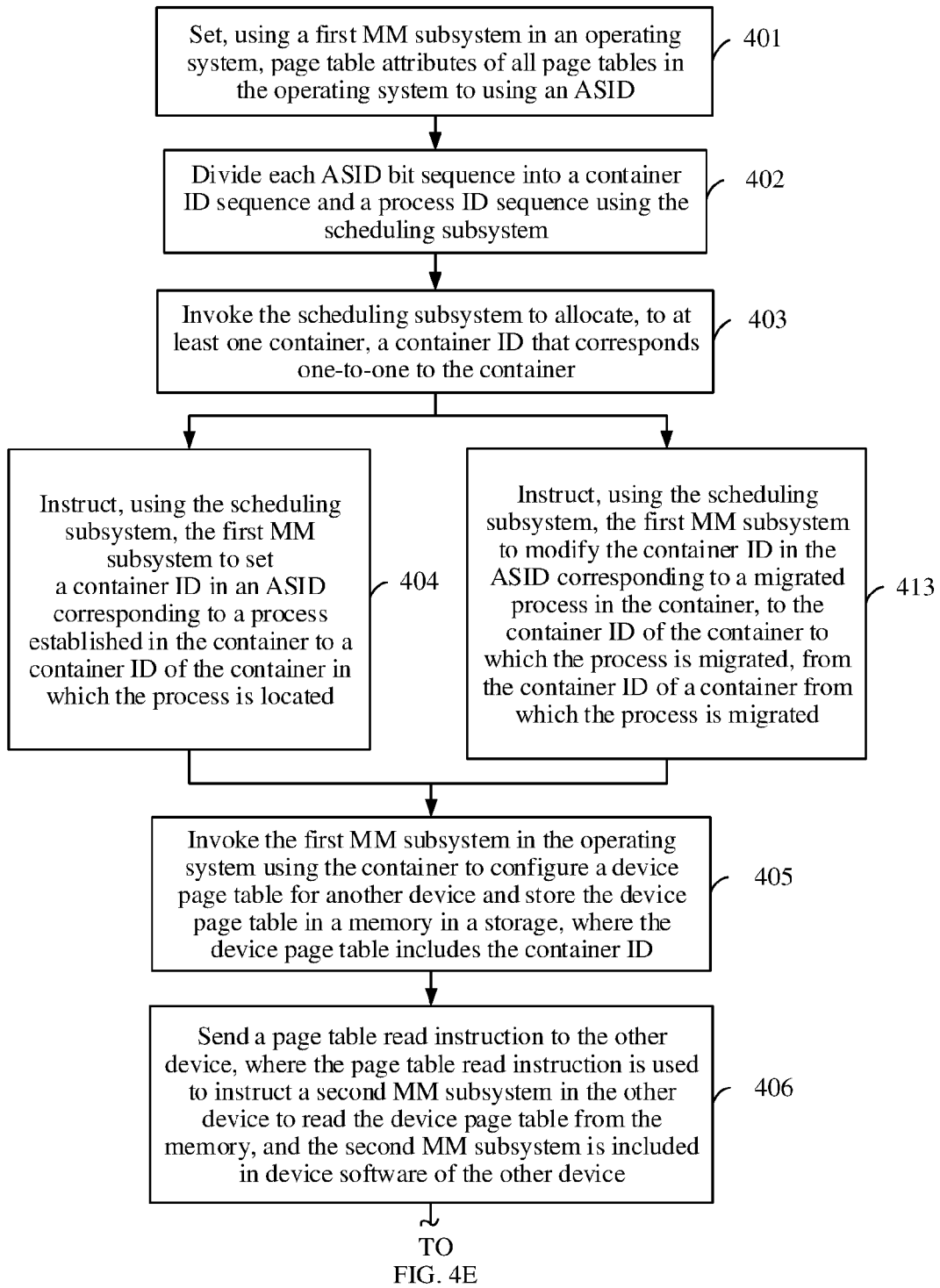
FIG. 4D and FIG. 4E are a method flowchart of a migrated process ASID modifying procedure related in the QoS control method provided in FIG. 4A and FIG. 4B.
Figure 4E:
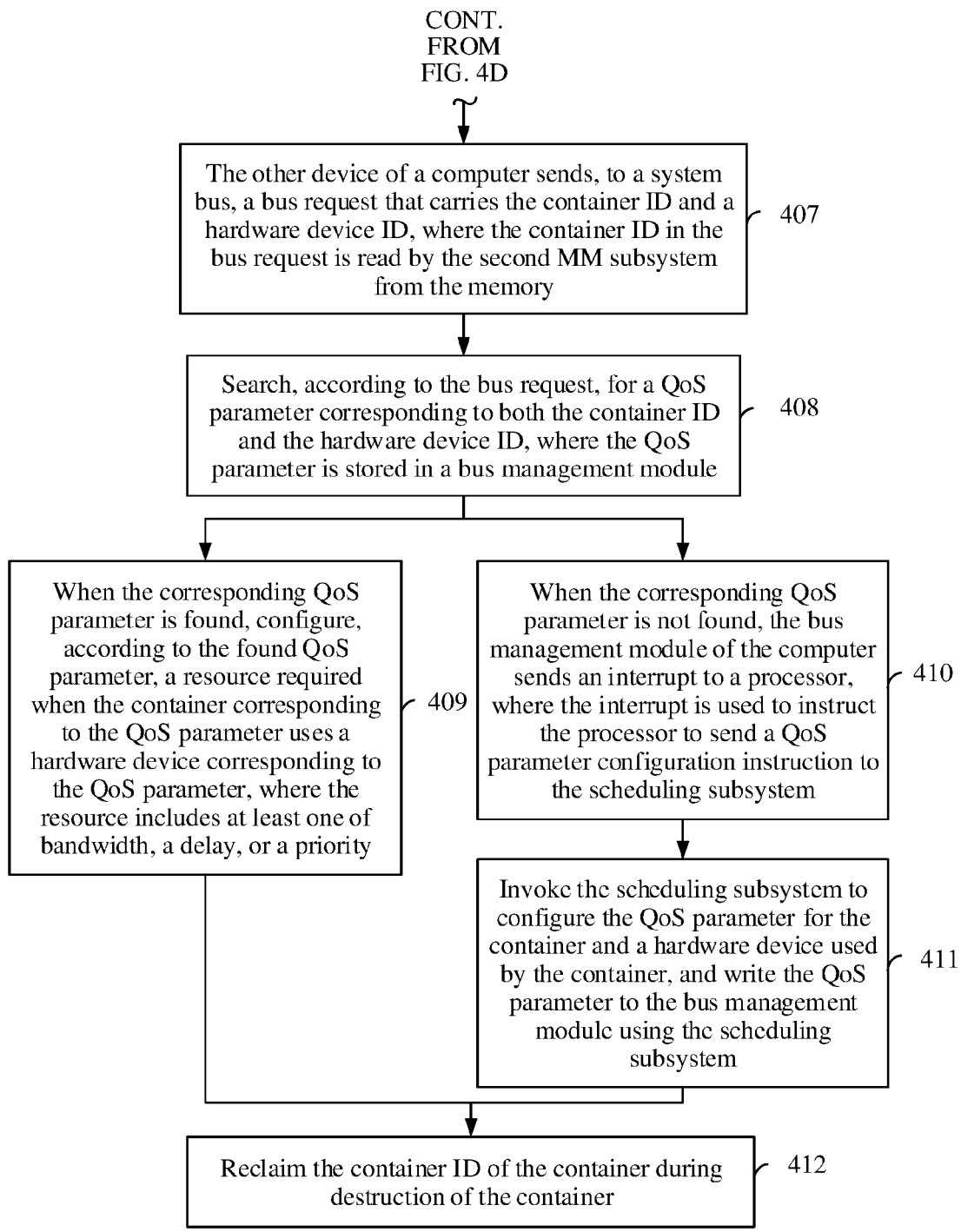

When the operating system supports process migration between containers, that is, a process 1 in a container A may be migrated to a container B, a container ID of a migrated process needs to be modified to a container ID of the container to which the process is migrated from a container ID of a container from which the process is migrated. In a possible implementation manner, as shown in FIGS. 4D and 4E, the foregoing method further includes the following step.

Step 413: Instruct, using the scheduling subsystem, the first MM subsystem to modify a container ID in an ASID corresponding to a migrated process in the container, to the container ID of the container to which the process is migrated, from a container ID of a container from which the process is migrated.

The ASID corresponding to the migrated process is located in a page table attribute of a process page table corresponding to the migrated process.

When detecting that there is a migrated process, the container instructs, using the scheduling subsystem, the first MM subsystem to replace the container ID in the ASID corresponding to the migrated process with the container ID of the current container.

It should be noted that, because the process ID allocated by the process management subsystem to the process is unique, and is not affected by the container in which the process is located, the process ID part in the ASID corresponding to the migrated process does not need to be re-configured.

For example, an ASID corresponding to a process A is 0000000010000010 (a container ID is 0000000010, and a process ID is 000010), and when the process A is migrated from an original container to a container with a container ID of 0000000110, the first MM subsystem needs to modify the ASID corresponding to the process A to 0000000110000010.

It should be noted that, because the container may be provided in an operating system of a virtual machine, and a same container may correspond to different QoS parameters in different virtual machines, the foregoing process page table may further include a virtual machine ID (VMID) of a virtual machine in which the container is located, and the bus request carries the VMID, the container ID, and the process ID. Correspondingly, the bus management module should further have a capability of identifying the VMID, and search for a QoS parameter corresponding to all of the VMID, the container ID, and the process ID. A mapping among a VMID, a container ID, a hardware device ID, and a QoS parameter may be shown in Table 3 as an example.

TABLE 3

|  | Virtual machine 1 | | Virtual machine 2 | |
| --- | --- | --- | --- | --- |
|  | Container 1 | Container 2 | Container 1 | Container 2 |
| Hardware device 1 | 10% | 2% | 20% | 2% |
| Hardware device 2 | 30% | 3% | 25% | 3% |

Correspondingly, the bus management module performs corresponding QoS control on the container according to the found QoS parameter when the container uses the hardware device.

When a hardware device that a container needs to use is a memory, that is, when the container needs to access the memory using a system bus, a first MM subsystem in an operating system no longer needs to configure a corresponding device page table for another device. In this case, the container may directly send a bus request to the system bus. Description is provided below using an embodiment.

Referring to FIG. 5A and FIG. 5B, FIG. 5A and FIG. 5B show a method flowchart of a QoS control method according to still another embodiment of the present disclosure. This embodiment is described using an example in which the QoS control method is used in the implementation environment shown in FIG. 1A and a hardware device used by a container is a memory or a processor. The method includes the following steps.

Step 501: Set, using a first MM subsystem in an operating system, page table attributes of all page tables in the operating system to using an ASID.

Step 502: Divide each ASID bit sequence into a container ID sequence and a process ID sequence using a scheduling subsystem.

Step 503: Invoke the scheduling subsystem to allocate, to at least one container, a container ID that corresponds one-to-one to the container.

Step 504: Instruct, using the scheduling subsystem, the first MM subsystem to set a container ID in an ASID corresponding to a process established in the container to a container ID of the container in which the process is located.

The ASID corresponding to the process is located in a page table attribute of a process page table corresponding to the process.

Step 505: Instruct, using the scheduling subsystem, the first MM subsystem to modify a container ID in an ASID corresponding to a migrated process in the container, to the container ID of the container in which the migrated process is located, from a container ID of a container from which the process is migrated.

The ASID corresponding to the migrated process is located in a page table attribute of a process page table corresponding to the migrated process.

An implementation manner of step 501 to step 504 is similar to an implementation manner of step 401 to step 404, an implementation manner of step 505 is similar to an implementation manner of step 413, and details are not described herein again.

Step 506: A processor of a computer sends, to a system bus using the first MM subsystem in the operating system, a bus request that carries the container ID and a hardware device ID.

Different from using another device by the container, when the hardware device used by the container is a memory, that is, when the container directly accesses the memory using the system bus, the first MM subsystem in the operating system no longer needs to configure a device page table. The first MM subsystem only needs to send, to the system bus according to an ASID bit sequence (that may be located in the page table attribute in the process page table) in the process page table, the bus request that carries the container ID (that is, the ASID bit sequence) and the hardware device (that is, the memory) ID.

It should be noted that, because performance of the processor is related to a computing capability of the processor and a speed at which the processor accesses the memory, QoS control performed on the container when the container occupies the processor is equivalent to QoS control performed on an event that the processor accesses the memory. When the hardware device used by the container is the processor, similar to using the memory by the container, the first MM subsystem sends, to the system bus, a bus request that carries the container ID and the hardware device (that is, the processor) ID.

Step 507: Search, according to the bus request, for a QoS parameter corresponding to both the container ID and the hardware device ID, where the QoS parameter is stored in a bus management module.

Step 508: When the corresponding QoS parameter is found, configure, according to the found QoS parameter, a resource required when the container corresponding to the QoS parameter uses a hardware device corresponding to the QoS parameter, where the resource includes at least one of bandwidth, a delay, or a priority.

QoS control for the container uses the memory is performed on a memory usage percentage, and QoS control for the container occupies the processor is performed on a usage percentage of the processor.

Step 509: When the corresponding QoS parameter is not found, the bus management module of the computer sends an interrupt to the processor, where the interrupt is used to instruct the processor to send a QoS parameter configuration instruction to the scheduling subsystem.

Step 510: Invoke the scheduling subsystem to configure the QoS parameter for the container and a hardware device used by the container, and write the QoS parameter to the bus management module using the scheduling subsystem.

Step 511: Reclaim the container ID of the container during destruction of the container.

An implementation manner of step 507 to step 511 is similar to an implementation manner of step 408 to step 412, and details are not described herein again.

In conclusion, according to the QoS control method provided in this embodiment, a container ID is allocated to each container using a scheduling subsystem, a bus request that carries the container ID and a hardware device ID is sent to a system bus when the container uses a hardware device, and a bus management module provided in the system bus searches for a QoS parameter corresponding to both the container ID and the hardware device ID, and configures, according to the QoS parameter, a resource required when the container uses the hardware device. A problem is resolved that resource requirements of a process group in a container cannot be met because an existing computer cannot perform corresponding QoS control on the container when the container occupies or accesses a hardware device. The system bus may perform corresponding QoS control according to the QoS parameter corresponding to both the container ID and the hardware device ID such that the hardware device allocated to the container can meet the resource requirements of the process group in the container.

It should be noted that, because the container may need to use both the other device and the memory or the processor, step 405 to step 407 and step 505 may be performed at the same time, and the present disclosure sets no limitation thereto.

For a method for setting a QoS parameter stored in a bus management module, there may be three possible setting methods of manual setting, automatic setting, and manual-automatic setting. When the manual setting is used, during establishment of a container, a scheduling subsystem receives a QoS parameter that is of the container for each hardware device and that is set by a user, and writes the QoS parameter to the bus management module. When the automatic setting is used, the scheduling subsystem automatically sets, according to a maximum bearer capability of a computer and usage information about using the hardware device by the container in a period of time, a QoS parameter meeting the computer capability, and writes the QoS parameter to the bus management module. When the manual-automatic setting is used, during establishment of a container, the scheduling subsystem receives only a QoS parameter that is of the container for a target hardware device and that is set by the user, and writes the QoS parameter to the bus management module. If the bus management module does not find the corresponding QoS parameter according to the bus request, the bus management module sends an interrupt to the processor, and the processor invokes, according to the interrupt, the scheduling subsystem to automatically set the corresponding QoS parameter, and writes the QoS parameter to the bus management module. Description is provided below using an embodiment as an example.

Figure 6A:
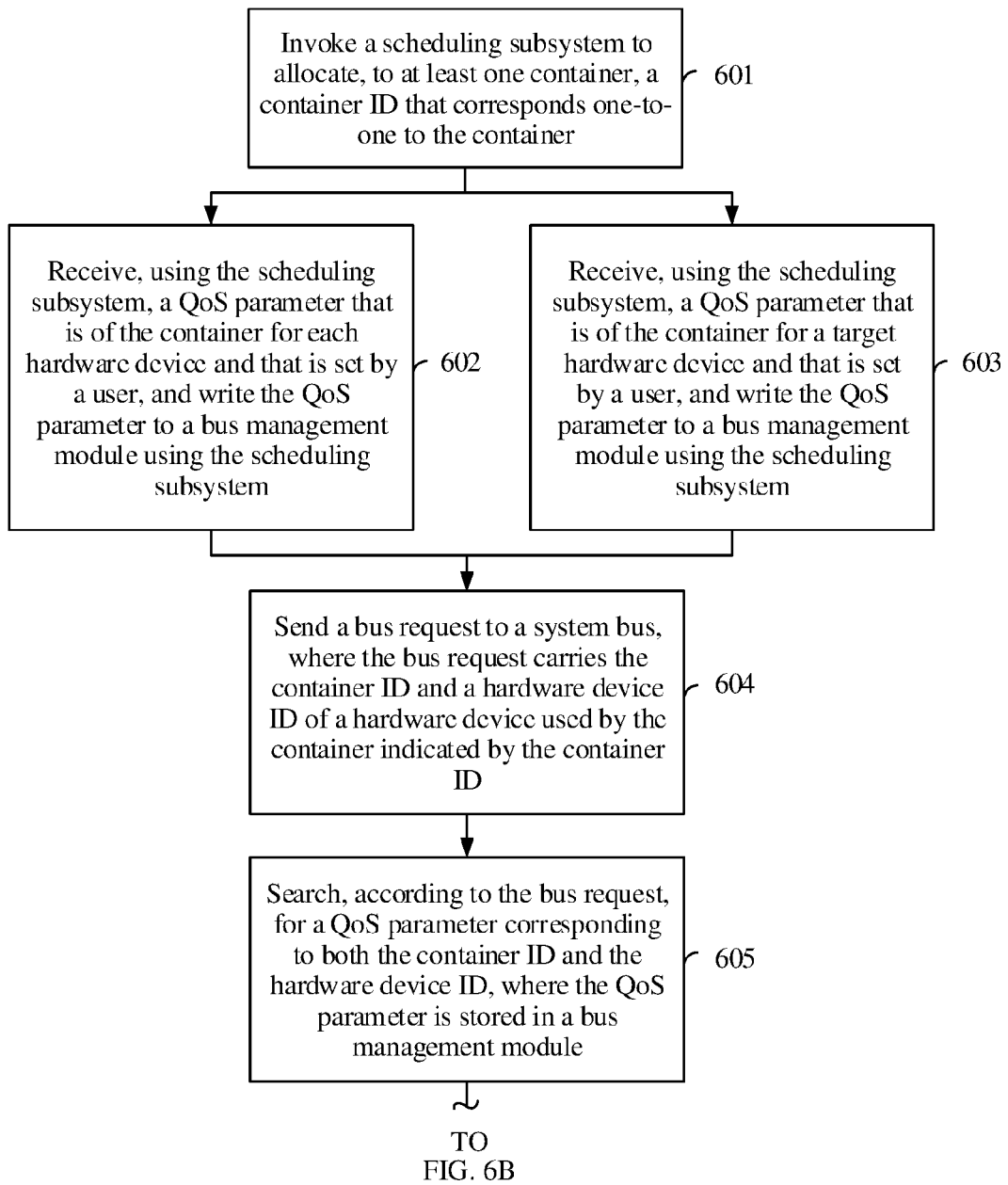
FIG. 6A and FIG. 6B are a method flowchart of a QoS control method according to yet another embodiment of the present disclosure.
Figure 6B:
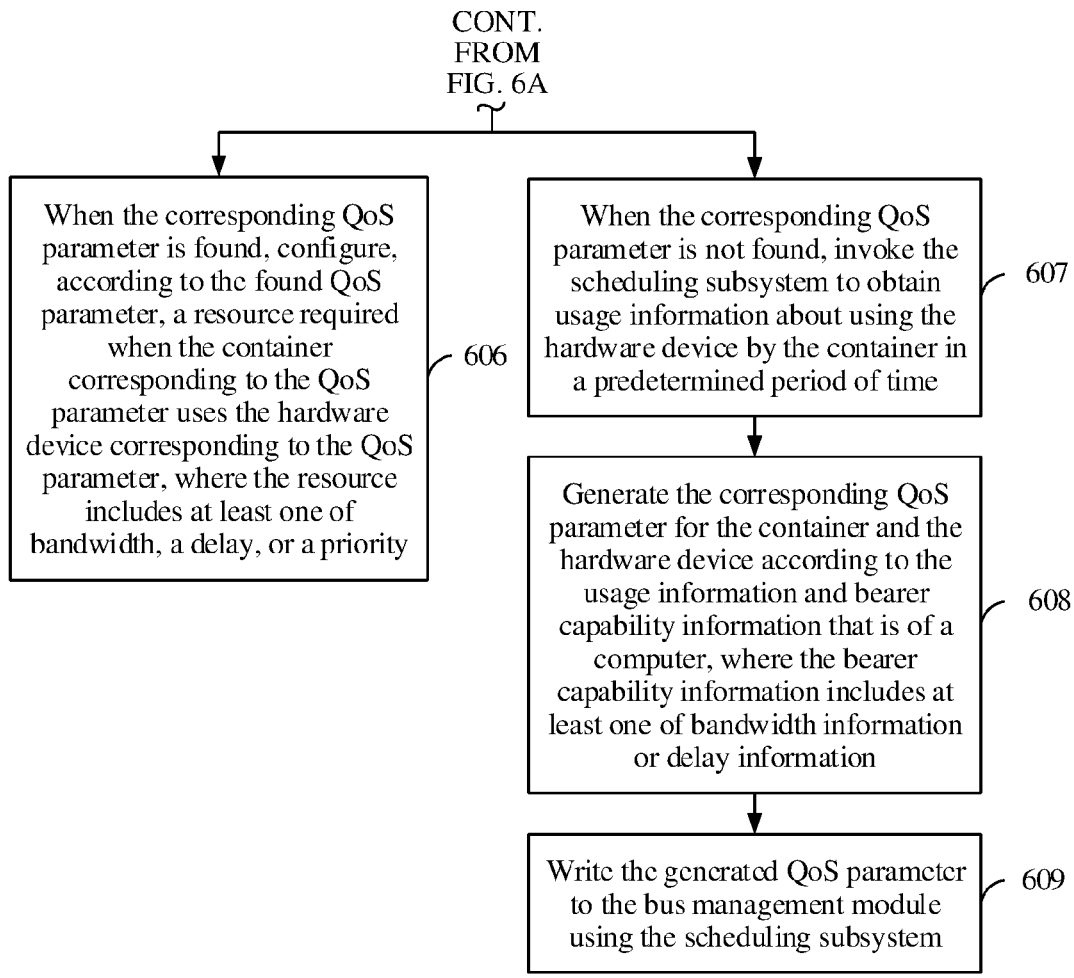

Referring to FIG. 6A and FIG. 6B, FIG. 6A and FIG. 6B show a method flowchart of a QoS control method according to yet another embodiment of the present disclosure. This embodiment is described using an example in which the QoS control method is used in the implementation environment shown in FIG. 1A. The method includes the following steps.

Step 601: Invoke a scheduling subsystem to allocate, to at least one container, a container ID that corresponds one-to-one to the container.

An implementation manner of this step is similar to that of step 403 and step 503, and details are not described herein again.

When a QoS parameter in a bus management module is manually set, the following step 602 is performed, or when a QoS parameter in a bus management module is set in a manual-automatic manner, the following step 603 is performed.

Step 602: Receive, using the scheduling subsystem, a QoS parameter that is of the container for each hardware device and that is set by a user, and write the QoS parameter to a bus management module using the scheduling subsystem.

When an established container uses fixed hardware devices, and uses a relatively small quantity of hardware devices, the user may select the method for manually setting a QoS parameter, and write, to a bus management module using the scheduling subsystem, a corresponding QoS parameter used when the container uses each hardware device.

Step 603: Receive, using the scheduling subsystem, a QoS parameter that is of the container for a target hardware device and that is set by a user, and write the QoS parameter to a bus management module using the scheduling subsystem.

When hardware devices used by an established container include a target hardware device with relatively high use frequency and a hardware device with relatively low use frequency, the user may select the manual-automatic manner to set the QoS parameter.

For example, hardware devices used by an established container 1 include a hardware device 1 with use frequency of 90%, a hardware device 2 with use frequency of 95%, a hardware device 3 with use frequency of 15%, and a hardware device 4 with use frequency of 35%. The user may determine hardware devices with use frequency greater than 80% as target hardware devices, and write corresponding QoS parameters to the bus management module using the scheduling subsystem.

It should be noted that, when the established container uses uncertain hardware devices, and a quantity of hardware devices is relatively large, the user may select automatic setting, and the scheduling subsystem performs setting according to a computer bearer capability and actual usage information, and the present disclosure sets no limitation thereto.

Step 604: Send a bus request to a system bus, where the bus request carries the container ID and a hardware device ID of a hardware device used by the container indicated by the container ID.

Step 605: Search, according to the bus request, for a QoS parameter corresponding to both the container ID and the hardware device ID, where the QoS parameter is stored in a bus management module.

Step 606: When the corresponding QoS parameter is found, configure, according to the found QoS parameter, a resource required when the container corresponding to the QoS parameter uses the hardware device corresponding to the QoS parameter, where the resource includes at least one of bandwidth, a delay, or a priority.

An implementation manner of step 604 to step 606 is similar to that of step 302 to step 304, and details are not described herein again.

Step 607: When the corresponding QoS parameter is not found, invoke the scheduling subsystem to obtain usage information about using the hardware device by the container in a predetermined period of time.

For the manual-automatic manner for setting a QoS parameter, when the bus management module does not store the corresponding QoS parameter, the scheduling subsystem may obtain the usage information about using the hardware device by the container in the predetermined period of time.

For example, the scheduling subsystem may obtain, in 10 seconds at frequency of one time per second, information such as network bandwidth occupied when the container uses the hardware device, and generate a usage information table shown in Table 4.

TABLE 4

| | First second | Second second | Third second | Fourth second | Fifth second | Sixth second | Seventh | Eighth second | Ninth second | Tenth second |
|---|---|---|---|---|---|---|---|---|---|---|
| Occupied network bandwidth | 56 kilobits per second (kbps) | 0 | 0 | 58 kbps | 0 | 60 kbps | 0 | 0 | 0 | 58 kbps |

Step 608: Generate the corresponding QoS parameter for the container and the hardware device according to the usage information and bearer capability information that is of a computer, where the bearer capability information includes at least one of bandwidth information or delay information.

The scheduling subsystem may further determine, according to the collected usage information and the bearer capability information that is of the computer, a feature on using the hardware device by the container.

When the usage information and the bearer capability information indicate that when the container uses the hardware device, a percentage of occupied bandwidth is relatively small (a percentage of the occupied bandwidth in relation to total network bandwidth is less than a preset threshold), and periods of time of occupying the bandwidth are discontinuous, when the container uses the hardware device, requirements on the QoS parameter are small occupied network bandwidth and a low delay. When the usage information and the bearer capability information indicate that when the container uses the hardware device, a percentage of occupied bandwidth is relatively large (a percentage of the occupied bandwidth in relation to the total network bandwidth is greater than the preset threshold), and periods of time of occupying the bandwidth are continuous, when the container uses the hardware device, requirements on the QoS parameter are large occupied network bandwidth and a high delay.

For example, voice information is sent between instant messaging clients in mobile phones, that is, when a process group in the container needs to use a voice collection device and a network device, usage information collected by the scheduling subsystem is shown in Table 3. The scheduling subsystem learns, by means of analysis according to the foregoing usage information, that when the container uses the hardware device, a percentage of occupied bandwidth is relatively small and periods of time of occupying the bandwidth are discontinuous, and determines that when the container uses the hardware device, requirements on the QoS parameter are small occupied network bandwidth and a low delay. Matching QoS parameters generated by the scheduling subsystem according to the foregoing usage features may be shown in Table 5.

TABLE 5

| Network bandwidth | Delay |
|---|---|
| 100 kbps | 5 milliseconds (ms) |

Step 609: Write the generated QoS parameter to the bus management module using the scheduling subsystem.

The scheduling subsystem writes the generated QoS parameter to the bus management module, to help the bus management module to perform QoS control according to the QoS parameter.

In conclusion, according to the QoS control method provided in this embodiment, a container ID is allocated to each container using a scheduling subsystem, a bus request that carries the container ID and a hardware device ID is sent to a system bus when the container uses a hardware device, and a bus management module provided in the system bus searches for a QoS parameter corresponding to both the container ID and the hardware device ID, and configures, according to the QoS parameter, a resource required when the container uses the hardware device. A problem is resolved that resource requirements of a process group in a container cannot be met because an existing computer cannot perform corresponding QoS control on the container when the container occupies or accesses a hardware device. The system bus may perform corresponding QoS control according to the QoS parameter corresponding to both the container ID and the hardware device ID such that the hardware device allocated to the container can meet the resource requirements of the process group in the container.

In this embodiment, a user may determine a suitable QoS parameter setting method according to a service actually executed by the process group in the container to improve accuracy of the QoS parameter stored in the bus management module.

Figure 7:
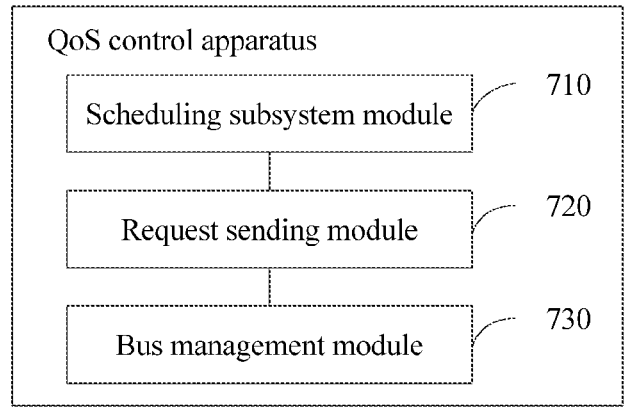
FIG. 7 is a structural block diagram of a QoS control apparatus according to an embodiment of the present disclosure.

Referring to FIG. 7, FIG. 7 shows a structural block diagram of a QoS control apparatus according to an embodiment of the present disclosure. The QoS control apparatus is applied to a computer. The computer includes a system bus and at least three hardware devices connected to the system bus. The at least three hardware devices include a processor, a storage, and at least one another device. The apparatus includes a scheduling subsystem module 710 configured to allocate, to at least one container of the computer, a container ID that corresponds one-to-one to the container, a request sending module 720 configured to send a bus request to the system bus, where the bus request carries the container ID and a hardware device ID of a hardware device used by the container indicated by the container ID, and a bus management module 730 configured to search, according to the bus request, for a QoS parameter corresponding to both the container ID and the hardware device ID, where the QoS parameter is stored in the bus management module 730, and the bus management module 730 is further configured to configure, according to the found QoS parameter, a resource required when the container corresponding to the QoS parameter uses the hardware device corresponding to the QoS parameter, where the resource includes at least one of bandwidth, a delay, or a priority.

In a possible implementation manner, the hardware device used by the container is the other device, and the other device includes at least one of a network device, an encryption/decryption device, a display device, or a video encoding/decoding device, and in an aspect of sending a bus request to the system bus, the request sending module 720 is further configured to invoke a first MM subsystem in an operating system using the container, to configure a device page table for the other device and store the device page table in a memory in the storage, where the device page table includes the container ID, send a page table read instruction to the other device, where the page table read instruction is used to instruct a second MM subsystem in the other device to read the device page table from the memory, and the second MM subsystem is included in device software of the other device, and invoke the other device of the computer to send, to the system bus, the bus request that carries the container ID and the hardware device ID, where the container ID in the bus request is read by the second MM subsystem from the memory.

In a possible implementation manner, the hardware device used by the container is a memory in the storage or the processor, and in an aspect of sending a bus request to the system bus, the request sending module 720 is further configured to invoke the processor of the computer to send, to the system bus using a first MM subsystem in an operating system, the bus request that carries the container ID and the hardware device ID.

In a possible implementation manner, the operating system of the computer includes a scheduling subsystem, and the operating system is stored in the storage, and in an aspect of allocating, to at least one container of the computer, a container ID that corresponds one-to-one to the container, the scheduling subsystem module 710 is further configured to invoke the scheduling subsystem to allocate, to the at least one container, the container ID that corresponds one-to-one to the container.

In a possible implementation manner, the scheduling subsystem module 710 is further configured to set, using the first MM subsystem in the operating system, page table attributes of all page tables in the operating system to using an ASID, and the scheduling subsystem module 710 is further configured to divide each ASID bit sequence into a container ID sequence and a process ID sequence using the scheduling subsystem.

In a possible implementation manner, the scheduling subsystem module 710 is further configured to instruct, using the scheduling subsystem, the first MM subsystem to modify the container ID in the ASID corresponding to a migrated process in the container, to the container ID of the container to which the process is migrated, from a container ID of a container from which the process is migrated, where the ASID corresponding to the migrated process is located in a process page table corresponding to the migrated process.

In a possible implementation manner, the bus management module 730 is further configured to send an interrupt to the processor, where the interrupt is used to instruct the processor to send a QoS parameter configuration instruction to the scheduling subsystem, and the scheduling subsystem module 710 is further configured to invoke the scheduling subsystem to configure the QoS parameter for the container and the hardware device used by the container, and write the QoS parameter to the bus management module 730 using the scheduling subsystem.

In a possible implementation manner, the scheduling subsystem module 710 is further configured to receive, using the scheduling subsystem, the QoS parameter that is of the container for each hardware device and that is set by a user, and write the QoS parameter to the bus management module 730 using the scheduling subsystem, or the scheduling subsystem module 710 is further configured to receive, using the scheduling subsystem, the QoS parameter that is of the container for a target hardware device and that is set by a user, where the target hardware device refers to a hardware device that the container uses at frequency greater than a preset frequency threshold, and write the QoS parameter to the bus management module 730 using the scheduling subsystem.

In a possible implementation manner, the bus management module 730 stores the QoS parameter of the container for the target hardware device, and the hardware device used by the container is not the target hardware device, the scheduling subsystem module 710 is further configured to invoke the scheduling subsystem to obtain usage information about using the hardware device by the container in a predetermined period of time, the scheduling subsystem module 710 is further configured to generate the corresponding QoS parameter for the container and the hardware device according to the usage information and bearer capability information that is of the computer, where the bearer capability information includes at least one of bandwidth information or delay information, and the scheduling subsystem module 710 is further configured to write the generated QoS parameter to the bus management module 730 using the scheduling subsystem.

In a possible implementation manner, the scheduling subsystem module 710 is further configured to reclaim the container ID of the container during destruction of the container.

In conclusion, according to the QoS control apparatus provided in this embodiment, a container ID is allocated to each container using a scheduling subsystem, when the container uses a hardware device, a bus request that carries the container ID and a hardware device ID is sent to a system bus, and the bus management module 730 provided in the system bus searches for a QoS parameter corresponding to both the container ID and the hardware device ID, and configures, according to the QoS parameter, a resource required when the container uses the hardware device. A problem is resolved that resource requirements of a process group in a container cannot be met because an existing computer cannot perform corresponding QoS control on the container when the container occupies or accesses a hardware device. The system bus may perform corresponding QoS control according to the QoS parameter corresponding to both the container ID and the hardware device ID such that the hardware device allocated to the container can meet the resource requirements of the process group in the container.

In this embodiment, the scheduling subsystem divides an ASID part in page table attributes into a container ID part and a process ID part, and the bus management module can identify the container ID in an ASID bit sequence in the bus request such that the bus management module can find the QoS parameter corresponding to both the container ID and the hardware device ID, and perform QoS control, thereby meeting resource requirements of process groups in different containers.

In this embodiment, the scheduling subsystem reclaims the container ID during destruction of the container such that the container ID can be recycled, thereby effectively relieving a case of container ID insufficiency in a container ID pool.

In this embodiment, a user may determine a suitable QoS parameter setting method according to a service actually executed by the process group in the container, to improve accuracy of the QoS parameter stored in the bus management module.

The sequence numbers of the foregoing embodiments of the present disclosure are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely examples of embodiments of the present disclosure, but are not intended to limit the present disclosure. Any modification, equivalent replacement, and improvement made without departing from the principle of the present disclosure shall fall within the protection scope of the present disclosure.

What is claimed is:

1. A computer, comprising:
a system bus comprising a bus management device;
a processor coupled to the system bus;
a storage coupled to the system bus, the storage comprising an operating system, and the operating system comprising a scheduling subsystem; and
at least one other device coupled to the system bus,
the processor being configured to invoke the scheduling subsystem to allocate, to at least one container of the computer, a container identity (ID) corresponding one-to-one to the at least one container,
the processor or the at least one other device being configured to send a bus request carrying the container ID and a hardware device ID of a hardware device used by the at least one container indicated by the container ID to the system bus, the hardware device comprising a memory in the storage or the processor, and the bus request being sent to the system bus comprising sending, to the system bus using a first memory management (MM) subsystem in the operating system, the bus request carrying the container ID and the hardware device ID, and
the bus management device being configured to:
search, according to the bus request, for a quality of service (QoS) parameter corresponding to both the container ID and the hardware device ID, the QoS parameter being stored in the bus management device; and
configure, according to the found QoS parameter, a resource required when the at least one container corresponding to the QoS parameter uses the hardware device corresponding to the QoS parameter, the resource comprising at least one of bandwidth, a delay, or a priority.

2. The computer of claim 1, wherein the hardware device comprises the at least one other device, the at least one other device comprises at least one of a network device, an encryption/decryption device, a display device, or a video encoding/decoding device, and when sending the bus request to the system bus, the processor is further configured to:
invoke the first MM subsystem in the operating system using the at least one container to configure a device page table for the at least one other device and store the device page table in a memory in the storage, the device page table comprising the container ID; and
send a page table read instruction to the at least one other device using the first MM subsystem, the page table read instruction instructing a second MM subsystem in the at least one other device to read the device page table from the memory, and the second MM subsystem being comprised in device software of the at least one other device.

3. The computer of claim 1, wherein the at least one other device is further configured to send, to the system bus, the bus request carrying the container ID and the hardware device ID, and the container ID in the bus request is read by a second MM subsystem from the memory.

4. The computer of claim 1, wherein the processor is further configured to:
set, using the first MM subsystem in the operating system, page table attributes of all page tables in the operating system to using an application specific ID (ASID); and
divide each ASID bit sequence into a container ID sequence and a process ID sequence using the scheduling subsystem.

5. The computer of claim 4, wherein the processor is further configured to instruct, using the scheduling subsystem, the first MM subsystem to set a container ID in an ASID corresponding to a process established in the at least one container to the container ID of the at least one container in which the process is located, and the ASID corresponding to the process being located in a process page table corresponding to the process.

6. The computer of claim 4, wherein the processor is further configured to instruct, using the scheduling subsystem, the first MM subsystem to modify a container ID in an ASID corresponding to a migrated process of the at least one container to a container ID of a container to which the migrated process is migrated, and the ASID corresponding to the migrated process being located in a process page table corresponding to the migrated process.

7. The computer of claim 1, wherein the processor is further configured to receive, using the scheduling subsystem, the QoS parameter of the at least one container for each hardware device set by a user, and write the QoS parameter to the bus management device using the scheduling subsystem.

8. A quality of service (QoS) control method, applied to a computer comprising a system bus, a processor, a storage, and at least one other device, the system bus comprising a bus management device, and the method comprising:
  allocating, to at least one container of the computer, a container identity (ID) corresponding one-to-one to the at least one container;
  sending a bus request carrying the container ID and a hardware device ID of a hardware device used by the at least one container indicated by the container ID to the system bus, the hardware device comprising a memory in the storage or the processor, and the bus request being sent to the system bus comprising sending, to the system bus using a first memory management (MM) subsystem in an operating system, the bus request carrying the container ID and the hardware device ID;
  searching, according to the bus request, for a QoS parameter corresponding to both the container ID and the hardware device ID, the QoS parameter being stored in the bus management device; and
  configuring, according to the found QoS parameter, a resource required when the at least one container corresponding to the QoS parameter uses the hardware device corresponding to the QoS parameter, the resource comprising at least one of bandwidth, a delay, or a priority.

9. The method of claim 8, wherein the hardware device comprises the at least one other device, the at least one other device comprising at least one of a network device, an encryption/decryption device, a display device, or a video encoding/decoding device, and sending the bus request to the system bus comprising:
  invoking the first MM subsystem in the operating system using the at least one container to configure a device page table for the at least one other device and store the device page table in a memory in the storage, the device page table comprising the container ID;
  sending a page table read instruction to the at least one other device, the page table read instruction instructing a second MM subsystem in the at least one other device to read the device page table from the memory, the second MM subsystem being comprised in device software of the at least one other device; and
  sending, by the at least one other device of the computer to the system bus, the bus request carrying the container ID and the hardware device ID, the container ID in the bus request being read by the second MM subsystem from the memory.

10. The method of claim 8, wherein the operating system of the computer comprises a scheduling subsystem, the operating system being stored in the storage, and allocating the container ID comprising invoking the scheduling subsystem to allocate, to the at least one container, the container ID corresponding one-to-one to the at least one container.

11. The method of claim 10, wherein before invoking the scheduling subsystem to allocate the container ID, the method further comprises:
  setting, using the first MM subsystem in the operating system, page table attributes of all page tables in the operating system to using an application specific ID (ASID); and
  dividing each ASID bit sequence into a container ID sequence and a process ID sequence using the scheduling subsystem.

12. The method of claim 11, wherein after allocating the container ID, the method further comprises instructing, using the scheduling subsystem, the first MM subsystem to set a container ID in an ASID corresponding to a process established in the at least one container to the container ID of the at least one container in which the process is located, and the ASID corresponding to the process being located in a process page table corresponding to the process.

13. The method of claim 12, wherein after allocating the container ID, the method further comprises instructing, using the scheduling subsystem, the first MM subsystem to modify a container ID in an ASID corresponding to a migrated process of the at least one container to a container ID of a container to which the migrated process is migrated, and the ASID corresponding to the migrated process being located in a process page table corresponding to the migrated process.

14. The method of claim 10, wherein after allocating the container ID, the method further comprises receiving, using the scheduling subsystem, the QoS parameter of the at least one container for each hardware device set by a user, and writing the QoS parameter to the bus management device using the scheduling subsystem.

15. A non-transitory computer-readable storage medium comprising instructions, which when executed by a computer comprising a system bus, a processor, a storage, and at least one other device, cause the computer to execute a method that comprises:
  allocating, to at least one container of the computer, a container identity (ID) corresponding one-to-one to the at least one container, the computer comprising an operating system stored in the storage, the operating system comprising a scheduling subsystem, and the container ID being allocated to the at least one container of the computer by invoking the scheduling subsystem to allocate, to the at least one container, the container ID corresponding one-to-one to the at least one container;
  sending a bus request carrying the container ID and a hardware device ID of a hardware device used by the at least one container indicated by the container ID to the system bus;
  searching, according to the bus request, for a quality of service (QoS) parameter corresponding to both the container ID and the hardware device ID, the QoS parameter being stored in a bus management device of the system bus; and
  configuring, according to the found QoS parameter, a resource required when the at least one container corresponding to the QoS parameter uses the hardware device corresponding to the QoS parameter, the resource comprising at least one of bandwidth, a delay, or a priority.

16. The non-transitory computer-readable storage medium of claim 15, wherein the hardware device comprises the at least one other device, the at least one other device comprising at least one of a network device, an encryption/decryption device, a display device, or a video encoding/decoding device, and sending the bus request to the system bus comprising:
  invoking a first memory management (MM) subsystem in the operating system using the at least one container to configure a device page table for the at least one other device and store the device page table in a memory in the storage, the device page table comprising the container ID;

sending a page table read instruction to the at least one other device, the page table read instruction instructing a second MM subsystem in the at least one other device to read the device page table from the memory, and the second MM subsystem being comprised in device software of the at least one other device; and sending, by the at least one other device of the computer to the system bus, the bus request carrying the container ID and the hardware device ID, the container ID in the bus request being read by the second MM subsystem from the memory.

17. The non-transitory computer-readable storage medium of claim 15, wherein the hardware device comprises a memory in the storage or the processor, and sending the bus request to the system bus comprises sending, by the processor of the computer to the system bus using a first memory management (MM) subsystem in the operating system, the bus request carrying the container ID and the hardware device ID.

18. The non-transitory computer-readable storage medium of clad wherein before invoking the scheduling subsystem to allocate the container ID, the method further comprises:

setting, using a first memory management (MM) subsystem in the operating systet page table attributes of all page tables in the operating system to using an application specific ID (ASID); and dividing each ASID bit sequence into a container ID sequence and a process ID sequence using the scheduling subsystem.

19. The computer of claim 1, wherein the processor is further configured to receive, using the scheduling subsystem, the QoS parameter of the at least one container for a target hardware device set by the user, and write the QoS parameter to the bus management device using the scheduling subsystem, the target hardware device referring to a hardware device that the at least one container uses at frequency greater than a preset frequency threshold.

20. The method of claim 10, wherein after allocating the container ID, the method further comprises receiving, using the scheduling subsystem, the QoS parameter of the at least one container for a target hardware device set by the user, and writing the QoS parameter to the bus management device using the scheduling subsystem, the target hardware device referring to a hardware device that the at least one container uses at frequency greater than a preset frequency threshold.

* * * * *

UNITED STATES PATENT AND TRADEMARK OFFICE
CERTIFICATE OF CORRECTION

PATENT NO.       : 10,169,089 B2
APPLICATION NO.  : 15/845568
DATED            : January 1, 2019
INVENTOR(S)      : Jian Zhang Page 1 of 1

It is certified that error appears in the above-identified patent and that said Letters Patent is hereby corrected as shown below:

On the Title Page

Item (30), Line 1: "201510641334" should read "201510641334.1"

In the Claims

Column 33, Line 24 Claim 18: "clad" should read "claim 15"

Column 34, Line 2 Claim 18: "systet" should read "system"

Signed and Sealed this
Twenty-sixth Day of February, 2019

Andrei Iancu
*Director of the United States Patent and Trademark Office*